(12) United States Patent  
Ushakov

(10) Patent No.: US 9,282,392 B2  
(45) Date of Patent: Mar. 8, 2016

(54) HEADSET FOR A MOBILE ELECTRONIC DEVICE

(71) Applicant: Alexey Ushakov, Moscow (RU)

(72) Inventor: Alexey Ushakov, Moscow (RU)

( * ) Notice: Subject to any disclaimer, the term of this patent is extended or adjusted under 35 U.S.C. 154(b) by 230 days.

(21) Appl. No.: 13/902,903

(22) Filed: May 27, 2013

(65) Prior Publication Data

US 2014/0185821 A1    Jul. 3, 2014

(30) Foreign Application Priority Data

Dec. 28, 2012   (RU) ................................ 2012158157

(51) Int. Cl.
*H04R 1/10*    (2006.01)
*H04R 25/00*   (2006.01)

(52) U.S. Cl.
CPC .............. *H04R 1/105* (2013.01); *H04R 1/1033* (2013.01); *H04R 1/1041* (2013.01)

(58) Field of Classification Search
CPC ....... H04R 1/1041; H04R 1/105; H04R 5/033
USPC .......... 381/74, 309, 301, 374, 370; 455/575.2
See application file for complete search history.

(56) References Cited

U.S. PATENT DOCUMENTS

| 7,623,667 | B2* | 11/2009 | Sander ................... | H04M 1/05 381/384 |
| 2008/0144854 | A1* | 6/2008 | Abreu .................... | G02C 3/003 381/74 |
| 2011/0216931 | A1* | 9/2011 | Bui ....................... | H04R 1/1091 381/333 |
| 2014/0037102 | A1* | 2/2014 | Alanis .................. | H04R 1/1041 381/74 |

\* cited by examiner

*Primary Examiner* — Vivian Chin
*Assistant Examiner* — Ammar Hamid

(57) ABSTRACT

Electronic necklace—headset for mobile electronic device in the form of a neck loop or necklace and a pair of wired headphones, where the headphone cords attached in close proximity to the back of electronic necklace and additionally connected together in the suboccipital node, located in the position of the device on the surface of the cervico-occipital region of the user to fix headphones and its cords, which reduces the slack of the cords and streamlines their excursion, creating conditions for continuous wear electronic necklace, including under the clothes, does not change the appearance of the user, allows to control an electronic necklace on touch over clothing, and inoperative can accommodate headphones shot and its cords in the back of the electronic necklace without having to remove the entire device.

29 Claims, 24 Drawing Sheets

(a)

(b)

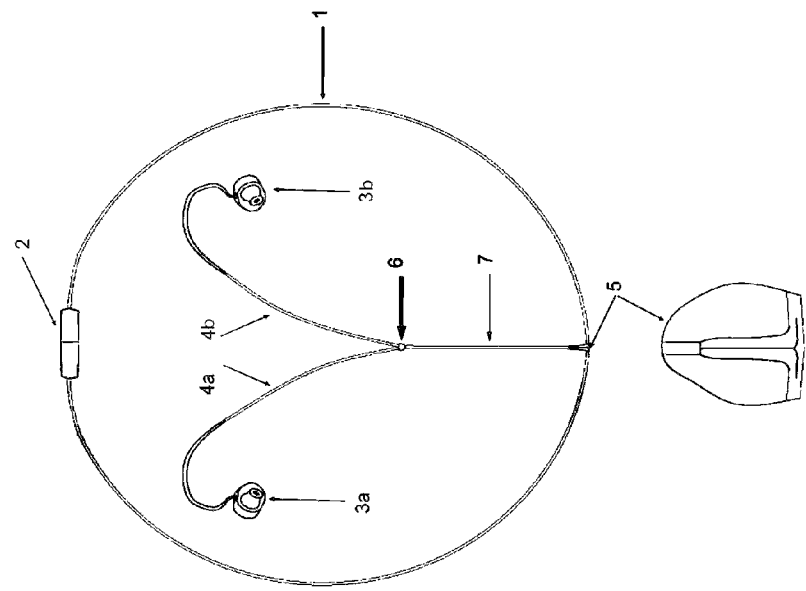
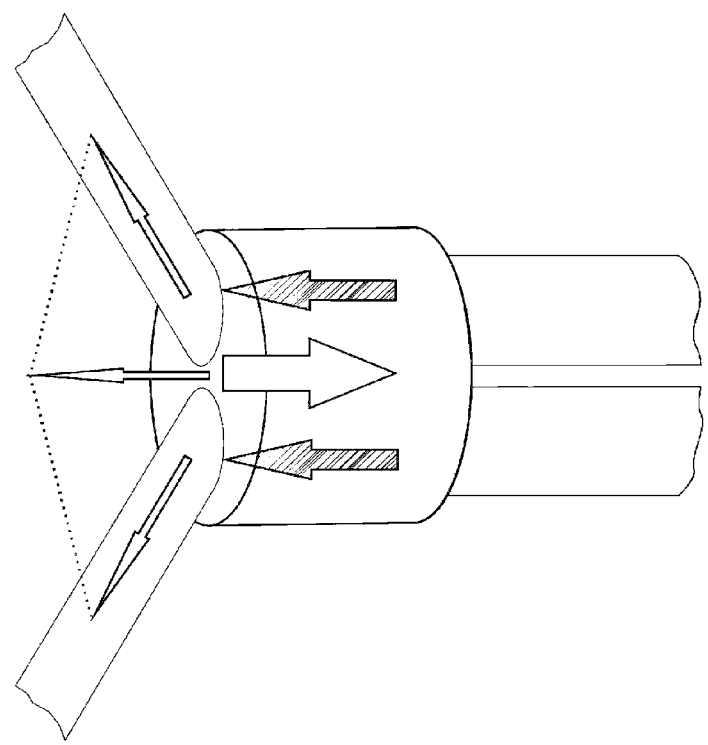

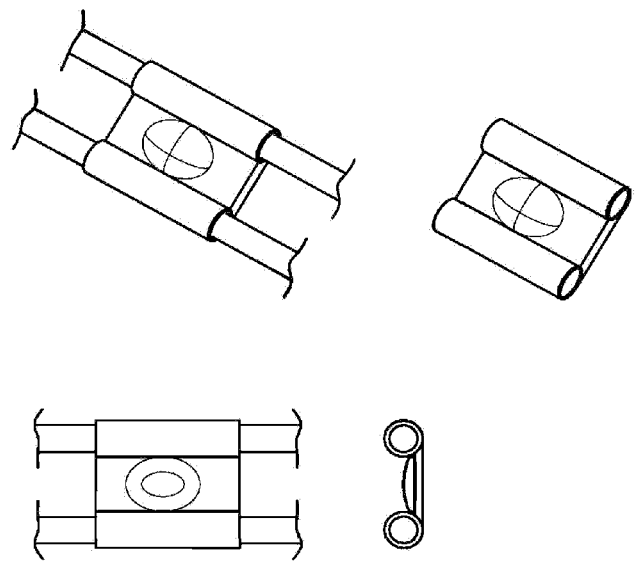
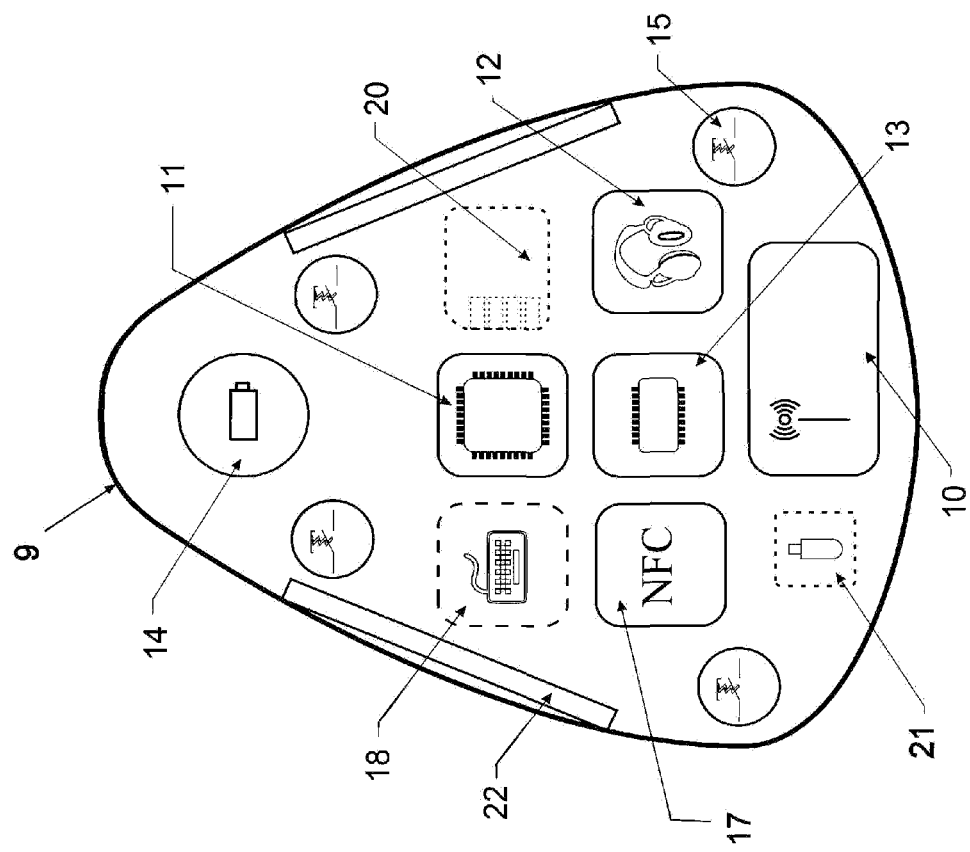
Fig. 26
Fig. 25

An exemplary algorithm implemented when buttons are pressed
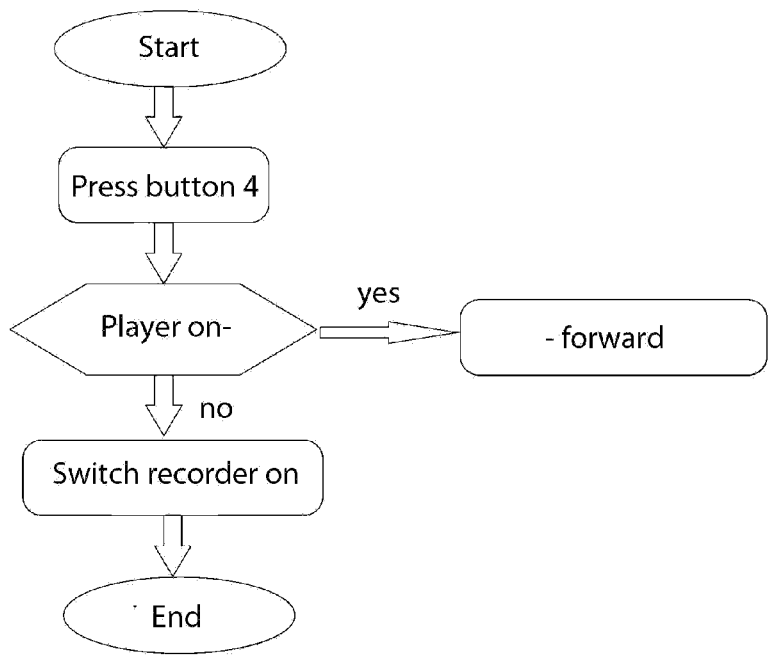
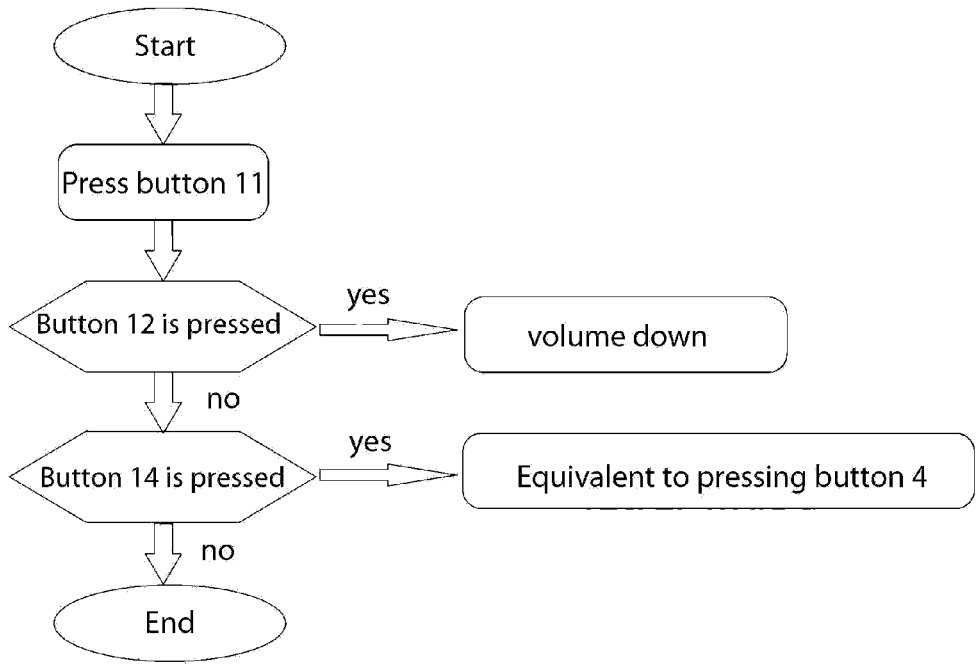
Fig. 29

HEADSET FOR A MOBILE ELECTRONIC DEVICE

FIELD OF THE INVENTION

The present invention relates to telecommunication devices, more particularly, to a headset for a mobile electronic device.

BACKGROUND ART

Current stereo headsets of a necklace, collar or neck loop type have predominantly two types of connection between earphones and the neck loop: headsets with two side nodes, in which earphone cords are connected with the neck loop and not connected between themselves, and headsets with a single back node, in which earphone cords are connected to each other and to the neck loop in the single node.

A conventional headset comprises earphones that are connected through cords to a supporting structure, which accommodates a signal transceiver and is connected to a necklace (neck loop) (U.S. Pat. No. 7,416,099 B2, publ. 26 Aug. 2008).

The headset comprises long unsecured sections of cords connecting the earphones with the neck loop, because the additional length is needed when the user rotates and moves the head relative to the torso. The headset has two nodes and the length of the movable portion of the cords in the headset is more than 19 cm. The cords hang freely along the entire length thereof in the air over the body surface, so they are slacking and may tangle and cling to surrounding objects. In addition, the headset is difficult to wear under clothing, in both operational and non-operational state, i.e. when the earphones are taken off.

An earphone storage structure comprises a necklace (analog of neck loop), two fasteners formed in the two ends of the necklace, and stoppers (U.S. Pat. No. 7,936,895 B2, publ. 3 May 2011). The size of the fasteners is less than the size of the stoppers and the size of the earphones, therefore the earphones may be pulled out when they are not used. The stoppers are actually connection nodes, and this device relates to headsets with two side nodes. The earphone storage structure has the same limitations as the previous device: cords are slacking, and the structure is difficult to wear under clothing and managing it over clothing.

A lanyard for a portable electronic device (U.S. Pat. No. 7,650,007 B2, published 19 Jan. 2010) comprises two side connection nodes and allows adjusting the length of earphone cords, but the lanyard does not eliminate sagging of cords in operational state.

In a necklace-type audio device (WO 2012/015257 A1, publ. 2 Feb. 2012), earphone cables form a neck loop when they are attached at the ends to a jack disposed on the user's chest, and crossed through two rings disposed in the back of the necklace (neck loop), the rings being adapted to adjust the length of the neck loop and earphone cables. In this device, the length of the cords connecting an earphone to the necklace (neck loop) is even longer than in necklace-type headsets with two side nodes; this fact contributes to slacking the cords, and peculiarities of adjusting the lengths of cords in the headset eliminates the possibility of wearing it under clothes.

Therefore, the conventional devices, first, comprise excessively long unsecured sections of cords that connect the head part of a headset with a neck loop (in headsets with a single node the length of freely hanging cords is about 19 cm, and in headsets with two side units it is about 25 cm) and, second, unsecured sections of cords in the conventional devices do not fit to the body surface. The cord slack cannot be fully removed without restricting the freedom of movement of the user's head. Therefore, when the devices are used the cords either slack, tangle and cling to surrounding objects, or restrict the freedom of movement.

Therefore, no constant wear device has been designed up to the present moment, which would have a small total length of freely hanging cords snuggly fitted to the body and creating no obstacles to movements of the head. Provision of such a device could improve the ease of use, secure fixation to the user's body, and prevent failures caused by the cords clinging with surrounding objects.

In general, slacking of cords depends on the following factors:

the length of movable portion of cords between fixed points; in all conventional neck headsets this is the length of cord from an earphone to the neck loop, so the shorter the movable portion of the cord, the less is the slack;

cord tension;

degree of adherence of the cord to the body surface;

position of the cords; cords disposed on a plane do not slack as opposed to cords hanging in the air or lying above natural depressions on the surface of user's body.

Impact of the above factors is illustrated in the drawings and is explained below on examples of conventional devices and a device according to the invention.

Basis for the inventive structure of a headset
for a mobile electronic device

When a user wears a headset (FIG. 1) in the form of a neck loop, a node that connects earphone cords 5 to a neck loop 1 rests on the dorsal surface of the user's neck, in the region of the seventh cervical vertebra. Slightly lower on the human body there is a trough deepening lying between the spinous and transverse processes of the vertebrae, sulcus dorsalis, at the level of the second-third thoracic vertebrae in the interscapular region, where a depression of various intensity of about 4×5 cm (depending on the constitution and development of subcutaneous fat) is formed at the place of attachment on the medial edges of both blades of serratus anterior muscle, and a large and minor rhomboids muscles (musculae rhomboidei major et minor). The depression may receive a cord winding mechanism and an earphone storage pocket, without projecting above the surface of the body and so without causing inconvenience to the user.

From the cord connection node on the neck loop the cords run up on the dorsal surface of the neck to the back of the head, on the paravertebral deepening, sulcus costae vertebralis major, not reaching the outside occipital protuberance at the level of the first-second cervical vertebrae, where an additional cord connection node, suboccipital node 6, is appropriate to arrange. If the cords are directed in V manner from the suboccipital node in the oblique anterior-upward direction slightly above or at the hairline, which is almost coinciding with the upper occipital skull line, through the mastoid regions (regiones mastoideae) of the neck, above the mastoid processes, through the projection of ligamentum auriculare superior, which attaches the top part of the auricular cartilage to the squamous part of the temporal bone on the upper section of the auricle between the front curl and tragus of the outer ear to a fixation point in the earphone 3 of the appropriate side, then the stable position of the suboccipital cord connection node will be provided by the availability of fixing anatomical structures at the datum point, such as the external occipital protuberance and lateral occipital projections, while a snug fit of the cords on the scalp is provided by stretching them on the dorsal surface of the head and neck in the places where the cords pass like a girth due to the partial hook-like overlap of the earphone cords through the ligamentum auriculare with additional fixing of the earphones inside the auricle.

With such attachment only the cords in the section 7 between nodes 5 and 6 are movable, and only this section may have a slack to compensate for the cord length, which changes when the head turns in the horizontal plane, tilts back, rocks from side to side, as well as when the movements are combined, that is, in all options that can arise in closed kinematic chains of the neck.

Cords 4 are relatively snug fitted to the scalp and fixed relative to the user's head, and their length does not vary at all the above movements and varies so little that these variations can be neglected.

Adherence and immobility of the cords 4 between the nodes are also promoted by the cellular connective tissue structure of the subcutaneous fat of the occipital region, a minor displacement of the skin in the area, the presence of Langer's lines running in the transverse direction in the skin, as well as the passage of the cord on a hollow of the postaural cavity, the hook-like overlap of the cords and positioning the earphones in the outer ear.

In conjunction with the suboccipital node the tension and absence of slack are further provided by the design of the used earphone, which is placed inside the auricle, in most cases, without arc, but having a stiff part—an earphone arm attached to the earphone body lying in the outer ear and continued upward from the helical root on the ascending part of the helix to the ligamentum auriculare superior, the attachment point of the top of the auricle to the temporal bone. A flexible cord extends from the stiff arm, leaning over the above ligamentum auriculare superior at an angle of less than 45°, which contributes to the fact that the rigid arm of the earphone forms a lever, where at accidental tearing off of the earphone cords, that is, when the cords are pulled at down and back tension vector, the arising moment abuts the earphone against the tragus, thereby fixing the earphone between the tragus and the external auditory canal.

In terms of biomechanics it should be noted that movements of the head are described on the basis of closed kinematic patterns, and extrapolation of even fairly complex combinations of head movements to the fixation points can be considered in only one narrative category—as lengthening-shortening the cord section between the dorsal cord connection node on the neck loop and the cord connection suboccipital node, which is almost stationary relative to the head and lies under the outer posterior occipital protuberance.

To construct a closed kinematic model, a headset can be represented as consisting of two basic parts and a movable connection thereof (FIG. 1).

A first part (head part) is stationary relative to the user's head, comprises two earphones 3, two earphone cords 4 enveloping the auricle from above, and a suboccipital node 6.

A second part is stationary relative to the user's body, comprises a neck loop 1 and a cord connection node disposed on the neck loop on the dorsal surface of the neck, a dorsal node 5.

As shown in FIG. 1, positions of the cord connection nodes has been chosen at reference numeral 5, point A (FIG. 2) and reference numeral 6, point B (FIG. 2). In this case, the length of the free-hanging cord 7 in the section between the nodes should be minimal.

To determine the length of the AB section, variations in the distance between points A and B when the head turns are to be considered. In this case, "distance" is the length of the geodesic line connecting points A and B on the surface of the neck (FIG. 2b). First, define the extension of the cord when the head rotates sideways. Maximum angle of rotation of the head is 90°. Determine the AB distance.

To determine the length of the geodesic line it is necessary to describe mathematically the surface of the neck and possible movements of the head and neck. The neck surface can be represented with sufficient accuracy as a cylinder (FIG. 2a). Head and neck can make the following motions: bending-tilting forward, extension/tilting backward, abduction and adduction/tilting to the left and to the right, turns to the left and to the right. High mobility of the cervical spine is due to its segmentation: having a height of about 13 cm, it contains seven medium-sized vertebrae and six high intervertebral discs. Between the first cervical vertebrae and the occipital bone, in the atlantal-occipital joint, adduction/abduction and flexion/extension of the head are performed, and between the first and second cervical vertebra turns of the head to the right and the left are performed. The joint work of these joints provides the head movement about three axes. Thus, combined movements of the head and neck are made in relation to the body, while independent movements of the head are made in relation to the neck. This is because the cervical spine is very flexible, and independent movements are possible between the first and second cervical vertebrae.

Consider the behavior of the kinematic model of the headset when the head rotates in the horizontal plane.

When the head rotates in the horizontal plane the neck twists mainly in the region between the first and second vertebrae. Moreover, since the cervical spine is located closer the back of the neck, the twisting axis is also close to the back surface of the cylinder. Since the twisting is performed only in the upper part of the cylinder about a non-central axis, the cylinder surface is distorted. The distortion is most strongly manifested in the region of the first and second cervical vertebrae, just where point B lies. The main part of the geodesic line passes below the distortion, so in the calculations we assume the surface as cylindrical. An important issue is the determination of the position of point B when the upper part of the cylinder is twisted to a maximum angle $\alpha=\pi/2$. Since ears are symmetric about the twisting axis, that is the axis of the vertebral column, and the point B is fixed by the taut cords in symmetrical position as well, the position of point B can be expected in the next central angle $\phi$ (FIG. 2b).

$$\varphi = \arcsin\left(\frac{R-D}{R}\right) \quad (1)$$

The height of point B will not change at rotation either because it is fixed by the taut earphone cords.

Consider the task of geodesic line of a cylinder having base radius R and height h (FIG. 2b). The line passes through two diametrically opposite points on different basis.

It's the differential of geodesic line:

$$ds = \sqrt{dx^2 + dy^2 + dz^2}$$

Since the curve lies on the surface of the cylinder, it is convenient to use cylindrical coordinates, with $dx^2 + dy^2 = R^2 d\phi^2$, where $\phi$ is the polar angle (FIG. 2b). In polar coordinates, the task reduces to finding dependence $z(\phi)$, at which the length of the curve is minimal or the functional:

$$S = \int_0^{\varphi_0} \sqrt{R^2 + z'^2}\, d\varphi \quad (2)$$

is minimal.

From the calculus of variations it is known that minimum is reached for the curve that satisfies the Euler equation, in this case:

$$\left(\frac{z'}{\sqrt{R^2+z'^2}}\right)' = 0 \qquad (3)$$

It follows that $z'(\phi)=a$, where a is the constant factor, then $z(\phi)=a\times\phi+b$. Coefficients are determined though boundary points A (R,0,0), the attachment point of the lower clip, and B(R, $\phi_0$, h) with the polar angle $\phi=0$ being at point A and equal to $\phi_0$ at point B. Then the coefficients are of the form: $a=h/\phi_0$, $b=0$. Then $z(\phi)=\phi\times h/\phi_0$. And the length of the curve is equal to the value of the functional, i.e.:

$$S = \int_0^{\varphi_0} \sqrt{R^2 + h^2/\varphi_0^2}\, d\varphi \qquad (4)$$
$$= \sqrt{\varphi_0^2 R^2 + h^2}$$

Thus, variation in distance AB or mobility of cords $\Delta S$ is:

$$\Delta S = \sqrt{h^2 + R^2\phi_0^2} - h \qquad (5)$$

With regard to expression (1) get the expression for mobility of cords:

$$\Delta S_t = \sqrt{h^2 + R^2 \arcsin^2\left(\frac{R-D}{R}\right)} - h \qquad (6)$$

Now consider for comparison variation in the length of cords at horizontal rotation of the head in conventional headsets. FIG. 3a shows an example of such a headset. In this case, cords are clamped at point A, and the movable part is the entire cord from point A to earphones disposed at points C and D. Conventionally denote the headset as a single node headset. Thus, mobility of the cords can be determined from the difference between the distances from point A and D when the head rotates at the angle of 90° in one direction and in the other direction, since while the distance or the geodesic line length increases in one direction, it decreases in the other direction. These two distances can be determined in FIG. 3b, where a minimum distance is the length of line AC, and a maximum distance corresponds to line AD. As a result, mobility of the cords can be found from the expression (5) with the assumption of h=H and $\phi_0=\pi$, and it has the form:

$$\Delta S_{t1} = \sqrt{H^2 + R^2\pi^2} - H \qquad (7)$$

Consider another type of a headset, which will be conventionally called a headset with two side nodes (FIG. 4a). In this case assume that the headset cord, at rotation, always passes through points at the base of the cylinder, i.e. points A and B, cord connection nodes. Then the minimum distance between points A and C or B and D is H. The maximum distance when the head is rotated to 90° is shown by geodesic lines AC and BD (FIG. 4b). As a result, mobility of the cords is also determined from expression (5) with the assumption of h=H and $\phi_0=\pi/2$, and is defined by the following expression:

$$\Delta S_{t2} = \sqrt{H^2 + R^2\pi^2/4} - H \qquad (8)$$

Next, consider behavior of the kinematic model when the head tilts forward and backward in the vertical plane.

Tilts of the head are performed by rotation of the head around the axis passing between the first cervical vertebra and the occipital bone. The tilt is often accompanied by a tilt of the entire cervical spine. In a headset with two nodes the tilt of the neck has a little effect on distance AB, but rotation of the head has a significant impact, since node B is disposed directly on the occipital part. Thus, knowing distance from B to axis of rotation r and angle of rotation $\alpha$ (5a), shift of node B can be estimated as $$BB_0 = r\alpha \qquad (9)$$

Obtain an expression for the length of segment AB at arbitrary angle $\alpha$ from the triangle AOB (FIG. 5b):

$$AB^2 = AO^2 + r^2 - 2AO \times r \times \cos(\alpha + \beta) \qquad (10)$$

Distance to axis r can be determined though the distance from the back surface of the neck to the center of the cervical spine, i.e. R-D, and the difference of heights of point B and the axis of rotation of the head $h_0$:

$$r = \sqrt{(R-D)^2 + h_0^2} \qquad (11)$$

From triangle $OO_1A$ obtain the following expression:

$$AO = \sqrt{(R-D)^2 + (h+h_0)^2} \qquad (12)$$

Expression for angle $\beta$ can be obtained from expressions (10), (11) and (12) by substituting $\alpha=0$, AB=h.

$$\beta = \arccos\frac{(R-D)^2 + hh_0 + h_0^2}{\sqrt{((R-D)^2 + (h+h_0)^2)((R-D)^2 + h_0^2)}} \qquad (13)$$

Thus, the expression for the AB has the form:

$$AB(\alpha) = \sqrt{\begin{array}{c}2(R-D)^2 + (h+h_0)^2 + h_0^2 - \\ 2\sqrt{((R-D)^2 + (h+h_0)^2)((R-D)^2 + h_0^2)}\cos(\alpha+\beta)\end{array}} \qquad (14)$$

It should be noted that in case of tilting the head backward expression (14) is no longer true, because there is no tension of the skin and soft tissues of the dorsal part of the neck. In this case it is appropriate to estimate distance $BB_0$ as the difference between heights of points B and $B_0$.

$$\Delta h = r(\cos(\gamma_0 + \alpha) - \cos\gamma_0) \qquad (15)$$

As a result, mobility of the cords is calculated from expression {14} by substituting $\alpha=\alpha_m$ (maximum tilt angle), and (15) by substituting $\alpha=\alpha_m$:

$$\Delta S_c = AB(\alpha_m) - \sqrt{(R-D)^2 + h_0^2}\,(\cos(\gamma_0 - \alpha_m) - \cos\gamma_0) \qquad (16)$$

Apparently, $\alpha_m$ cannot exceed $\gamma_0$ due to the limit on deformation of the neck. To assess mobility of the cords we may assume $\alpha_m = \gamma_0$, then with regard to expression (14) obtain:

$$\Delta S_c = AB(\gamma_0) - \sqrt{(R-D)^2 + h_0^2}(1 - \cos\gamma_0) \qquad (17)$$

In case of headsets with a single node or with two side nodes rotation in the vertical plane affects the height of points C and D. Variation in the latter, $\Delta h_0$, can be determined if relative distance $r_0$ between axis CD and the axis of rotation, as well as angular position $\alpha_0$ of the axes are known (FIG. 6a):

$$\Delta h_0 = r_0(\cos\alpha_0 - \cos(\alpha_0 + \alpha)) \qquad (18)$$

As a result, variation in the distance or mobility of cords for a headset with a single node can be obtained from formula (4) with $H-\Delta h_0$ set instead of h and $\phi=\pi/2$. In this case, angle $\alpha$ varies in the range $-\alpha_m<\alpha<\alpha_m$, and the height varies in the range:

$$\Delta h_{01} = r_0(\cos\alpha_0 - \cos(\alpha_0 - \alpha_m)) < \quad (19)$$
$$\Delta h_0 < r_0(\cos\alpha_0 - \cos(\alpha_0 + \alpha_m))$$
$$= \Delta h_{02}$$

$$\Delta S_{c1} = \sqrt{(H - \Delta h_{01})^2 + R^2\pi^2/4} - \sqrt{(H - \Delta h_{02})^2 + R^2\pi^2/4} \quad (20)$$

FIG. 6b illustrates the case of a headset with two side nodes. Mobility of the cords can be estimated through variation in heights of points C and D. Then, from expression (19) obtain mobility of the cords in the following form:

$$\Delta S_{c1} = \Delta h_{02} - \Delta h_{01} \quad (21)$$

Like the case of a headset with two nodes, estimates $\alpha_m = \gamma_0 = \alpha_0$ are true. Then obtain the following estimates for mobility of cords:

$$\Delta S_{c1} = \sqrt{(H + r_0(1-\cos\gamma_0))^2 + R^2\pi^2/4} - \sqrt{(H - r_0(\cos\gamma_0 - \cos2\gamma_0))^2 + R^2\pi^2/4} \quad (22)$$

$$\Delta S_{s2} = r_0(1-\cos2\gamma_0) \quad (23)$$

Also consider behavior of the kinematic model when the head tilts sideway in the vertical plane.

When the head tilts sideway the movement of the head can be represented as rotation of the upper part of a cylinder about axis s, which passes approximately through point O of intersection of axes t and c.

In the case of a headset with two nodes such rotation is accompanied by a shift of point B, which can be estimated through the distance to axis of rotation $O_1B_0$ (FIG. 7a). As seen in FIG. 7b: $O_1B_0 = h_0$. To determine the length of AB it is necessary to determine horizontal shift $\Delta s$ and vertical shift $\Delta h$ of point B, because $AB = \sqrt{(h+\Delta h)^2 + \Delta s^2}$. In this case $\Delta h = h_0(1-\cos\alpha)$ and $\Delta s = h_0\sin\alpha$. Then mobility of section AB when the head tilts sideway will changed to maximum angle $\alpha_m$:

$$\Delta S_s = \sqrt{(h+h_0(1-\cos\alpha_m))^2 + h_0^2\sin^2\alpha_m} - h \quad (24)$$

Now consider the case of a headset with side nodes. In this case, variation in segments AC and BD can be accounted for by considering the shift of points C and D on arcs of circle from points $C_0$ and $D_0$. The length of AC in the case of the head tilt shown in FIG. 7b can be found as:

$$AC = AC_0 + R_s\alpha = H + R_s\alpha \quad (25)$$

Here $R_s$ is the radius of rotation trajectory about axis s, which can be found from triangle $COO_2$, where $OO_2$ can be found, given that the height of point O is $h+h_0$ (FIG. 5b), then $OO_2 = H-h-h_0$, and $CO_2 = R$, therefore:

$$CO = R_s = \sqrt{(H-h-h_0)^2 + R^2} \quad (26)$$

To determine BD only variation in the height of point D, $\Delta H = R_s \sin\alpha$, should be taken into account because the cord in this area is loose:

$$BD = H - \Delta H = H - R\sin\alpha \quad (27)$$

Considering maximum deflection angle $\alpha_m = 45°$ the following expression can be obtained for mobility of cords:

$$\Delta S_{s2} = R_s\alpha_m + R\sin\alpha_m \quad (28)$$

Now consider the case of a headset with a single node (FIG. 8). In this case, the calculation is more complicated and requires special treatment for the length of geodesic line AC. In this task the surface of the neck can be described as a surface of an inclined cylinder. To do this, find the angle of inclination of the cylinder surface, $\beta$. From triangles $BCC_0$ and $OCCO_0$ find $CC_0 = 2R_s\sin(\alpha/2)$;

$$BC = \sqrt{H^2 + 4R_s^2\sin^2(\alpha/2) - 4HR_s\sin(\alpha/2)\sin(\alpha/2-\gamma)} \quad (29)$$

From $BCC_0$ obtain:

$$BC/\sin(\pi/2-\alpha/2+\gamma) = 2R_s\sin(\alpha/2)/\sin\beta$$

so obtain:

$$\beta = \arcsin(2R_s\sin(\alpha/2)\cos(\alpha/2-\gamma)/BC) \quad (30)$$

Here $$\gamma = \arctan(R/(H-h-h_0)) \quad (31)$$

Therefore, $$AC = \sqrt{(BC(1-\sin\beta))^2 + \pi^2 R^2\cos^2\beta/4} \quad (32)$$

It should be noted that, taking into account the dependence of BC and $\beta$ on angle $\alpha$ from equations (29) and (30), we can expect a nonmonotonic dependence of the line length AC($\alpha$). FIG. 9 shows this dependence for parameters listed in Table 1. It can be seen that AC reaches maximum $AC_{max} = 16.6$ cm at angle $\alpha_0 = 8.6$o.

Now find the length of AD because this line describes the minimum length of the cord. In this case we may consider that the height of the cylinder has changed to $\Delta H = R_s\sin\alpha$, then using the expression (27) obtain:

$$AD = \sqrt{(H - R_s\sin\alpha)^2 + \pi^2 R^2/4} \quad (33)$$

As a result, mobility of cords $\Delta S_{s1}$ is determined as the difference of the lengths of lines $AC_{max}$ and AD at the maximum angle of inclination, $\alpha_m$:

$$\Delta S_{s1} = AC_{max} - \sqrt{(H-R\sin\alpha_m)^2 + \pi^2 R^2/4} \quad (4)$$

Table 1 shows the comparison of cord mobility for various types of headsets. As seen in the table, a headset with two nodes, that is a headset, in which two earphone cords are connected to the neck loop through a dorsal cord connection node in close proximity to each other and have an additional point of fixation to each other, a suboccipital node; the cords have the lowest mobility as compared with conventional headsets. This advantage applies to all kinds of movements of the head. Comfortable wear of the headset is determined by the maximum possible mobility of cords, respectively, the difference between the minimum and maximum possible length of loose cord, arising at different positions of the head. In a headset with two nodes the maximum length is determined by maximum distance AB between the nodes, that is the length AB defined in expression (14). In a headset with a single node, the maximum length of the cord is achieved when the head rotates to 90°:

$$L_{max\,1} = \sqrt{H^2 + R^2\pi^2} \quad (35)$$

For a headset with two side nodes obtain the maximum length when the head tilts sideway:

$$L_{max\,2} = H + R_s \alpha_m \quad (36)$$

Table 1 contains numerical estimates, from which it follows that the headset with two nodes has a minimum length of a maximum extended, but slack portion of cord. It should also be noted that the estimates obtained for a headset with two side nodes have been deliberately reduced, because cords passing from points A and B to the transceiver are not taken into account, and account of them would significantly increase $L_{max2}$.

Therefore, the availability of two optimally positioned nodes A and B contributes not only to reduction in slacking of the cords, but also provides tension of the cords emanating from node B to earphones. Since these cords lie on the curved surface of the neck, the tension creates a pressure on the skin (FIG. 10). As a result of this pressure there arises a friction force of the cord against the skin and a pressure force of the suboccipital cord connection node, node B, against soft tissues, while the difference of vectors of these forces leads to fixation of the cords on the scalp and further secures earphones in the auricle. Thus, the fastening force is concentrated not only on the auricles, and not only by fixing the earphones in the external auditory canal, but it is uniformly distributed over the entire length of the cord, which greatly facilitates wearing of the earphones. Node B, i.e. suboccipital cord connection node, is hold in a stable position owing to the uniform distribution of various forces that arise in the occipital region at the specified arrangement geometry of the cords and their mutual coupling, taking into account human anatomical features.

FIG. 10 shows a vector diagram of projections of the forces acting on the suboccipital cord connection node, node B. Node B is fixed through tension of the cords. Thin arrows indicate tensile forces of the cords, the total of which creates pressure on the skin. As a result, node B experiences a force of reaction of the skin and surrounding tissues, indicated by wide arrow, that seeks to move the node down, and the arising forces of friction against the cord, marked with wide solid arrow, fix the position of node B. In this model, the tension of cords below the node was neglected, as its length has been chosen for optimal and the cord is loose, has an excess length of about 9.8 cm to ensure mobility of the cords in movements of the head and neck.

Table 1 summarizes results of comparison of cord mobility and maximum cord length in headsets with different geometries.

SUMMARY OF THE INVENTION

The object of the present invention is to provide a headset for a mobile electronic device, in which each cord connecting an earphone to a neck loop comprises a movable part and a stationary part, and where decreasing the length of the movable part of the cords, arrangement of the movable parts on a plane and fitting the stationary parts of the cords against the user's body and fixation of the stationary parts by tension would ensure less slack of earphone cords and thus reduce the likelihood of catching the cords and pulling off the earphone out of the auricle, and enable continuous wear of the headset by the user in operational state and with the earphones taken off, and improve the ability of winding the earphone cords.

The object is accomplished in a headset for a mobile electronic device, comprising: a neck loop with at least one electrical connector attached thereto; two earphones; two cords, each of the cords being connected at one end to one of the earphones and at the other end to the electrical connector; wherein said two cords are mechanically connected to the neck loop, and points of connection of the cords to the neck loop are in close proximity to each other and form a dorsal cord connection node, and are further mechanically connected to each other in sections between the earphones and the dorsal cord connection node to form a suboccipital cord connection node at the connection point.

Preferably, when worn by the user in operational state, the dorsal cord connection node and the suboccipital cord connection node are to be disposed on the dorsal surface of the neck, and cords in sections between the earphones and the suboccipital node are disposed above the auricle and located on the surface of the head in taut state.

Preferably, when worn by the user in operational state, the dorsal cord connection node is disposed at the level of the seventh cervical vertebra, the suboccipital cord connection node is disposed at the level of the external occipital protuberance, and the section of cords between the suboccipital and dorsal cord connection nodes has a length determined by the maximum distance between the first and seventh cervical vertebrae of the user, measured on the dorsal surface of the neck with the head rotated sideway and tilted downward at the same time.

Preferably, the section of cords between the suboccipital and dorsal cord connection nodes has a length in the range from 5 cm to 13 cm.

TABLE 1

Comparison of mobility and maximum length of cord in headsets with various geometry

| | | Movement | | | | |
|---|---|---|---|---|---|---|
| | | Rotation of head in horizontal plane | | Tilt of head forward/backward | | Tilt of head sideway |
| Headset type | Formula | Estimate at parameters: | Formula | Estimate at parameters: | Formula | Estimate at parameters |
| Headset with two nodes | (6) | $R = 6.5$ cm, $h = 6$ cm, $D = 1$ cm, $\alpha = 90° = 1.6$ rad $\Delta S_t = 2.9$ cm | (12) | $R = 6.5$ cm, $h_0 = 2$ cm, $D = 1$ cm $\Delta S_c = 8.6$ cm $L_{max} = 9.8$ cm (see expression (14)) | (24) | $R = 6.5$ cm, $h = 6$ cm, $h_0 = 2$ cm $\alpha_m = 45° = 0.8$ rad $\Delta S_s = 0.6$ cm |
| Headset with single node | (7) | $R = 6.5$ cm, $H = 13$ cm $\Delta S_{t1} = 12.5$ cm | (18) | $r_0 = 3$ cm, $\gamma_0 = 45°$ $\Delta S_{c1} = 2.2$ cm $L_{max\,1} = \sqrt{H^2 + R^2\pi^2} = 25.5$ cm | (34) | $R = 6.5$ cm, $h = 6$ cm $h_0 = 2$ cm $\alpha_m = 45° = 0.8$ rad $\Delta S_{s1} = 3.4$ cm |
| Headset with two side nodes | (8) | $R = 7$ cm, $H = 13$ cm $\Delta S_{t2} = 5.2$ cm | (19) | $r_0 = 3$ cm, $\gamma_0 = 45°$ $\Delta S_{c2} = 3$ cm $L_{max\,2} = H + R_s \alpha_m = 19.4$ cm | | $R = 6.5$ cm, $h = 6$ cm $h_0 = 2$ cm $\alpha_m = 45° = 0.8$ rad $\Delta S_{s2} = 11$ cm |

Preferably, in some embodiments the suboccipital cord connection node is a clip adapted to move along the cords for adjusting the length of the cords.

Preferably, the suboccipital node comprises an electrical connector for disconnecting the cords.

Preferably, at least one cord in the section between the suboccipital and dorsal cord connection nodes is in the form of a helical spring.

Preferably, the headset further comprises a spring disposed between the suboccipital and dorsal cord connection nodes.

Preferably, the headset further comprises at least one electronic unit mechanically and electrically coupled to at least one electrical connector.

Preferably, the headset further comprises at least two control means positioned on the neck loop and made in the form of buttons, said control buttons issue commands only when two buttons are pressed at the same time.

Preferably, the control means are adapted to transmit acoustic warning that is transmitted to the user's earphone only when a command is issued. Preferably, the buttons of the control means have bordering flanges to prevent accidental pressing.

Preferably, the headset comprises at least one power supply arranged on the neck loop.

Preferably, the headset comprises at least one microphone arranged on the neck loop.

Preferably, a part of the cord near the earphone is accommodated in a tubular guide having a contact member on its outer surface to electrically connect the headset with an additional electronic device.

Preferably, the neck loop comprises at least two connectors to connect additional sections of the neck loop.

Preferably, the headset comprises a cord winding mechanism and a cord storage pocket, both arranged on the neck loop.

Preferably, the headset further comprises a cone-shaped spring mesh attached at the apex to the suboccipital cord connection node and at the base to the edge perimeter of the storage pocket.

Preferably, the cord winding mechanism comprises a reel with a helical spring accommodated inside and a fishing line wound on the reel and connected at one end to the reel and at the other end to the suboccipital cord connection node, so that when the fishing line is wound on the reel, the suboccipital cord connection node is drawn to the dorsal cord connection node, and the section of cords between the suboccipital and dorsal nodes is arranged in the storage pocket.

The object is further accomplished in a headset for a mobile electronic device, comprising: two earphones; an electrical connector; two cords, each of the cords being connected at one end to one of the earphones and at the other end to the electrical connector; wherein said two cords are mechanically connected to each other to form a neck loop by sections of cords, which are arranged between the point of connection thereof with each other and with the electrical connector, and further mechanically connected to each other in a point on the sections of cords between the earphones and the neck loop.

Preferably, the cords are connected to each other by at least one clip adapted to move along the cords for adjusting the length of the cords against each other.

Preferably, the headset further comprises at least one electronic unit connected mechanically and electrically to the electrical connector.

Preferably, the headset further comprises at least two control means in the form of buttons disposed on the cords forming the neck loop.

Preferably, the control buttons comprise bordering flanges to prevent accidental pressing.

Preferably, the headset further comprises at least one power supply arranged on the cords forming the neck loop.

Preferably, the headset further comprises at least one microphone arranged on the cords forming the neck loop.

Preferably, the cords comprise at least one additional electrical connector.

Preferably, the cords comprise at least one contact member to connect sections of the cords to each other.

Technical effect provided by the present invention includes the ability of reducing the length of the movable portion of the cords between the earphone and the neck loop, and the adherence of the stationary portion of the cord to the surface of the user's body and fixation of the stationary portion by tension substantially eliminate slack of the cords connecting the earphones with the neck loop, which in turn, prevents breakage of cords or earphones and provide additional further opportunity for constant wear of the headset by the user in operational state and with the earphones taken off, because the cords do not impair the aesthetic appearance of the user when worn in operational or non-operational state. Furthermore, a mechanism for full or partial winding up of the earphone cords when not in use can be easier arranged on the headset.

BRIEF DESCRIPTION OF DRAWINGS

The invention will be further explained in the description of preferred embodiments with reference to the accompanying drawings, wherein:

FIG. 10 is a vector diagram of forces, according to the invention;

FIG. 11 is a general view of a headset in one embodiment, showing main functional components according to the invention;

FIG. 26 shows an embodiment of protection of buttons, according to the invention;

FIG. 29 shows an exemplary algorithm implemented when buttons are pressed, according to the invention;

DESCRIPTION OF PREFERRED EMBODIMENTS

The terms and expressions used herein shall have the meanings which may be different from the common meaning.

Headset is the set of mechanically connected cords, earphones and electrical connectors, configured with the capability to be worn on the user's body and designed for wired and wireless communications with a mobile electronic device.

Earphone is a device for personal listening to music, voice or other audio signals, which fits in the external ear of the user.

Neck loop is a piece of a linear material such as rope, wire, fabric, leather or chain, shaped in the form of a loop, ring, necklace, necktie, or collar; designed to be worn on the user's neck and chest and adapted to accommodate electrical and mechanical devices thereon.

Electrical connector is a detachable or non-detachable electrical device for mechanical connection of electrical circuits.

Cord is a flexible linear electric conductor comprising one or more twisted or adjacent, isolated or non-isolated leads, cords or individual cords, with or without an integral insulation above them.

Connection node is a point where two or more pieces of linear material, such as rope or cord, are mechanically connected to each other, or a point where they are attached to anything in close proximity to each other by binding, weaving, tying, gluing, enclosure in a general housing like cambric, or by another available means.

Electronic unit is an electrical device for corded and cordless communications, adapted to be disposed on a neck loop and electrically coupled to other components on the headset.

Control means is an interface component between a headset and user, configured as a mechanical, piezoelectric or another button or key having a bounded surface, a pressure on which leads to changing the function of the associated device.

Dorsal means being on the back.

Occipital means being on the back of the head.

Suboccipital means being under the back of the head.

Dorsal, occipital and suboccipital are used herein to describe the position of headset components on the surface of the user's body.

Excursion means movement, mobility of an organ or joint, or movement, mobility of headset components disposed on these organs or joints relative to other parts of the headset.

NFC (Near Field Communication) is a short-range wireless high-frequency communications method.

PAN (Personal Area Network) is a network organized around a person for communication among personal electronic devices, such as a smartphones, laptops, cordless and corded headsets. Standard wireless networks currently include Bluetooth, Zigbee, Piconet, Wi-Fi, Ultra-Wide Band, Kleer, NFC.

Figure 1:
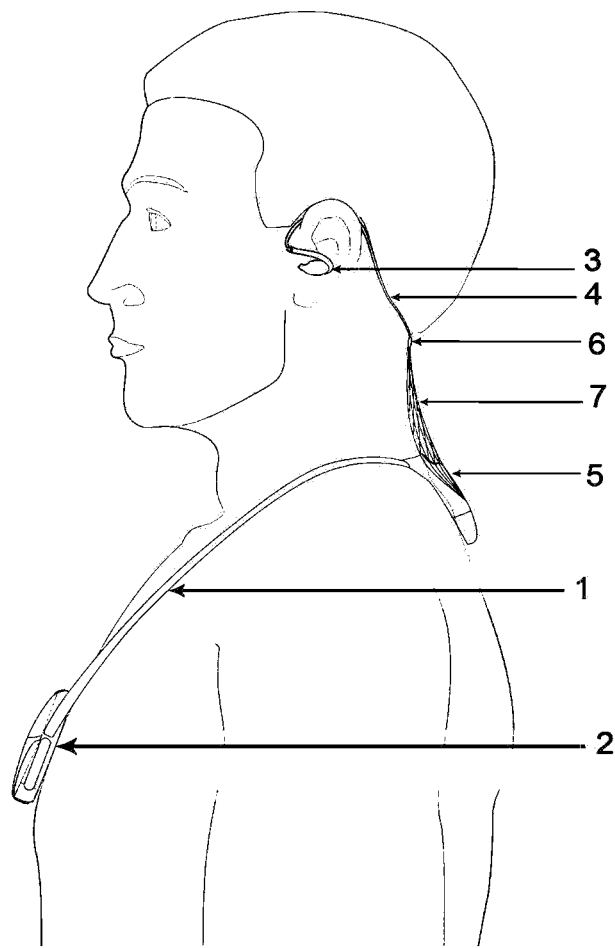
FIG. 1 shows a general view of a headset in operational state on the user according to the present invention.
Figure 2:
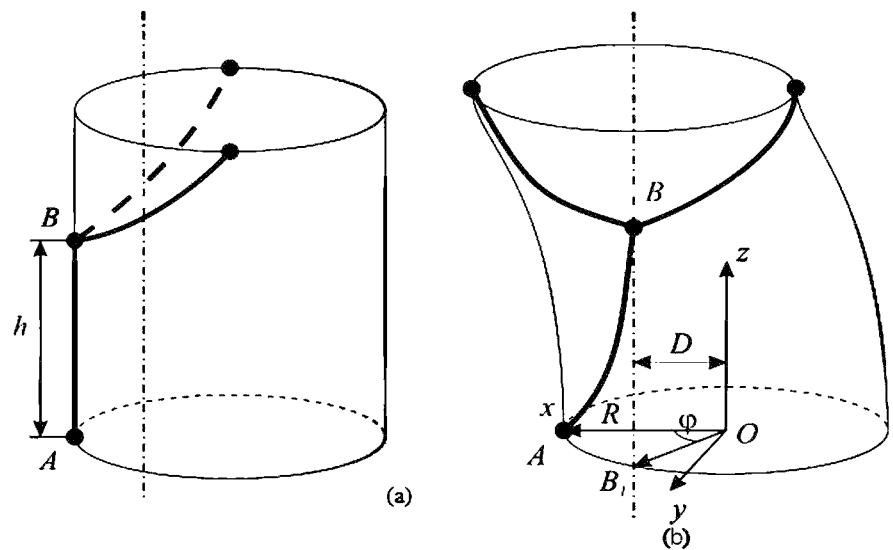
FIG. 2a, b shows a mathematical model of the neck surface with a headset with two nodes, where the head is shown in normal position and rotated at angle $\pi/2$, according to the present invention.
Figure 3:
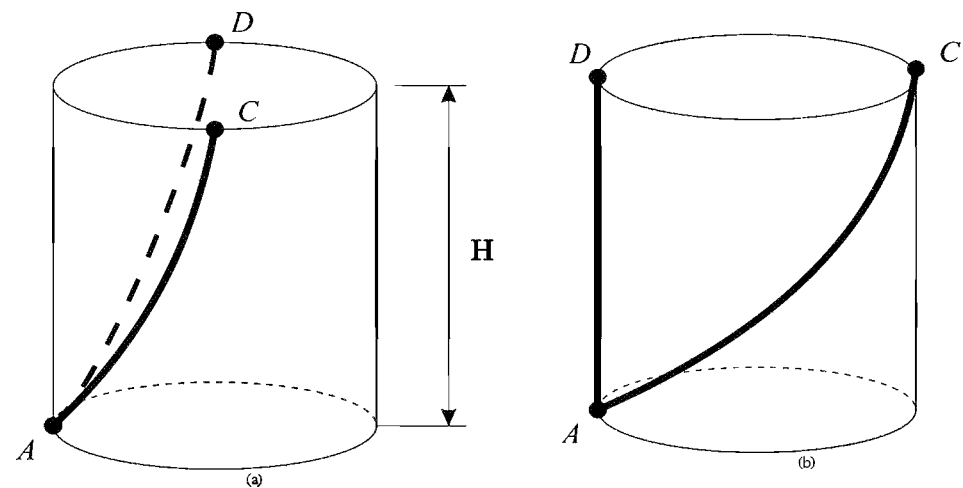
FIG. 3a, b shows a mathematical model of the neck surface with a headset with a single node, where the head is shown in normal position and rotated at angle $\pi/2$, according to the present invention.
Figure 4:
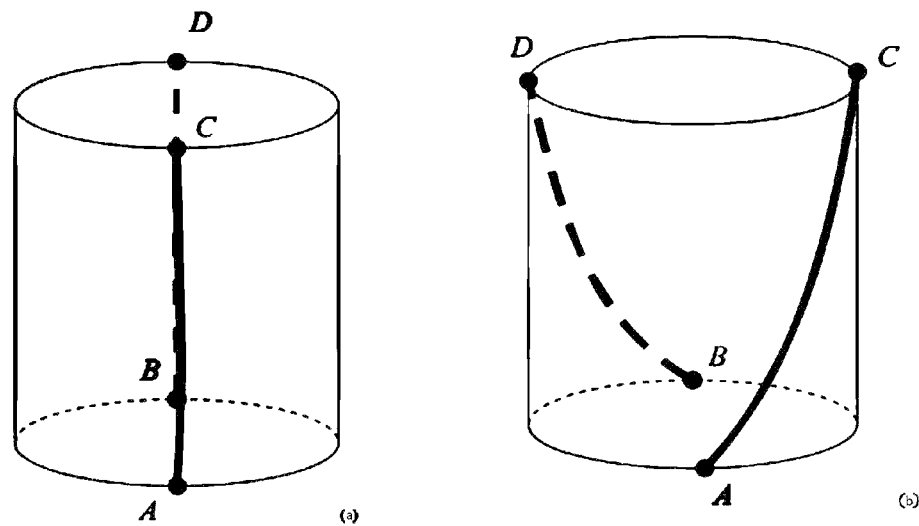
FIG. 4a, b shows a mathematical model of the neck surface with a headset with two side nodes, where the head is shown in normal position and rotated at angle $\pi/2$, according to the present invention.
Figure 5:
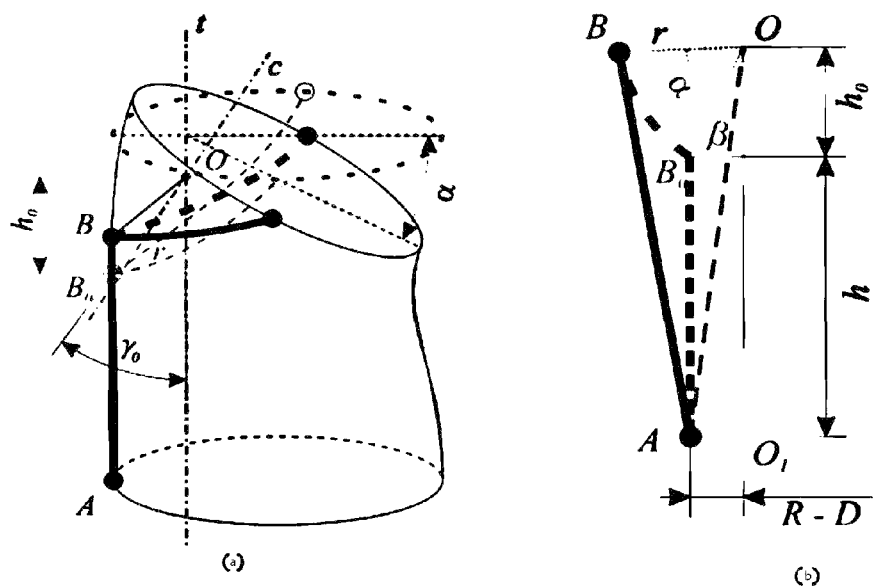
FIG. 5a shows a mathematical model of the neck surface with a headset with two nodes where the head is tilted vertically, according to the invention.
FIG. 5b shows the calculation of the length of segment AB when the head is tilted forward at arbitrary angle $\alpha$, according to the invention.
Figure 6:
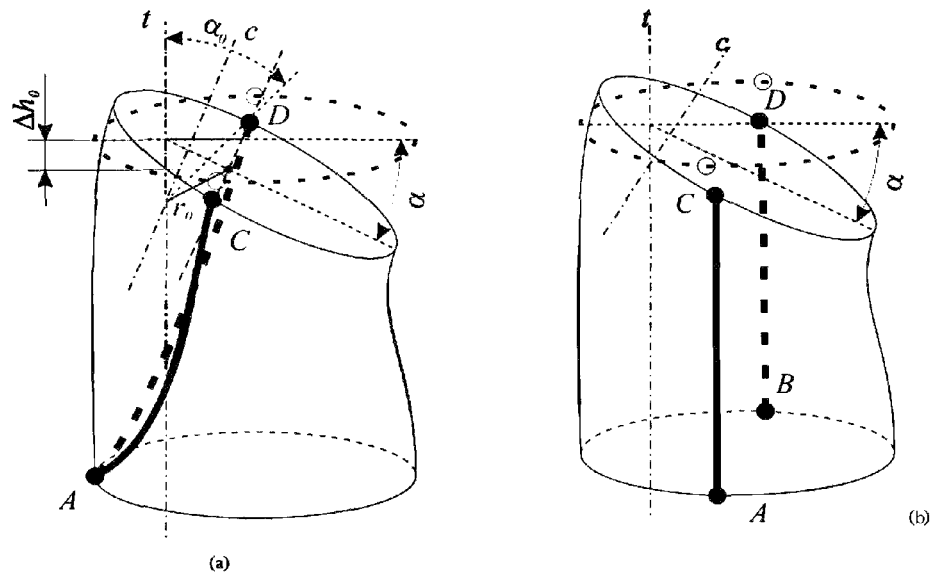
FIG. 6a, b shows a mathematical model of the neck surface with a headset with a single node, with two side nodes, when the head is tilted vertically, according to the invention.
Figure 7:
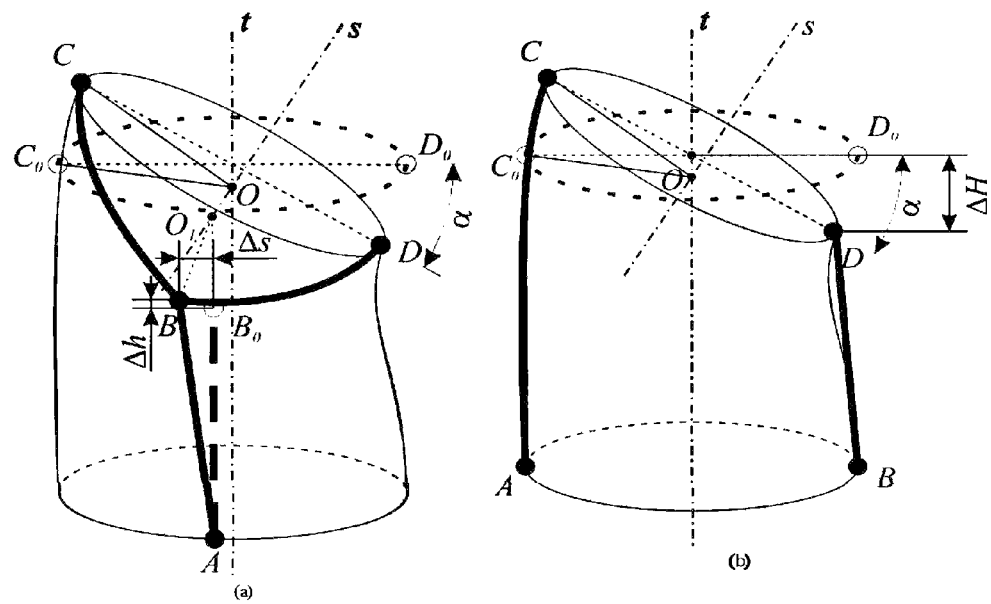
FIG. 7a, b shows a mathematical model of a head tilted sideway with a headset with two nodes and a headset with two side units, according to the invention.
Figure 8:
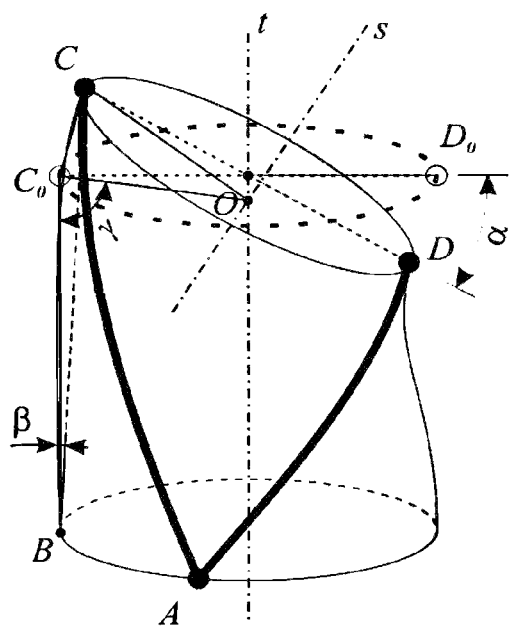
FIG. 8 shows a mathematical model of a head tilted sideway with a headset with a single node, according to the invention.
Figure 9:
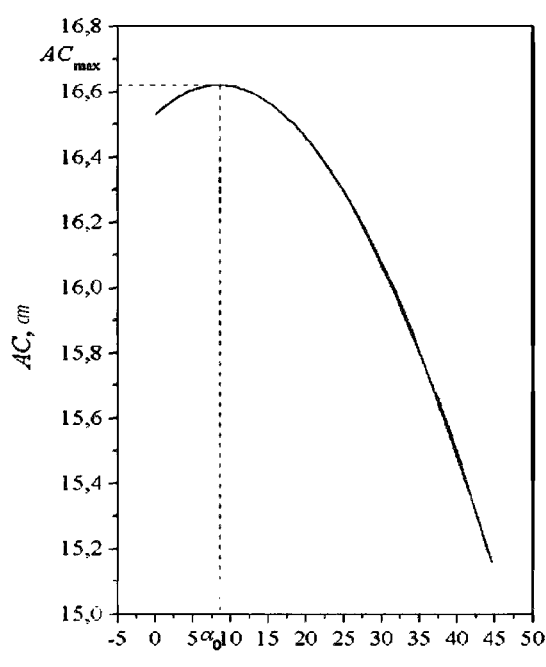
FIG. 9 shows the dependence of the length of geodesic line AC on tilt angle $\alpha$ of a head, according to the invention.

A headset for a mobile electronic device (FIG. 1, FIG. 10) comprises a neck loop 1 with at least one electrical connector 2 attached to it; two earphones 3a, 3b; two cords 4a, 4b, each connected at one end to one of the earphones, and at the other end to the electrical connector, and these two cords are connected mechanically to the neck loop 1 so that the points of connection of the cords with the neck loop are in close proximity to each other and form a dorsal cord connection node 5, and they are additionally mechanically connected to each other at a location on sections between the earphones and the dorsal cord connection node 5 to form a suboccipital cord connection node 6 at the point of connection thereof.

When the headset is worn in operational state the dorsal cord connection node 5 and the suboccipital cord connection node 6 are to be positioned on the dorsal surface of the neck and cords 4 on the sections between the earphones 3 and the suboccipital node 6 are to be positioned above the auricle and placed on the head surface in taut state.

When the headset is worn in operational state the dorsal cord connection node 5 is positioned at the level of the seventh cervical vertebra, the suboccipital cord connection node 6 is positioned at the level of the external occipital protuberance, and section 7 of the cords between the dorsal and suboccipital cord connection nodes has a length defined by the maximum distance between the first and seventh cervical vertebrae of the user, measured on the dorsal surface of the neck when the head is rotated sideway and tilted down at the same time, and this length is in the range from 5 cm to 13 cm.

Figure 12:
FIGS. 12, 13, 14 show various embodiments of a headset in operational and non-operational state on the user, according to the invention.
Figure 13:
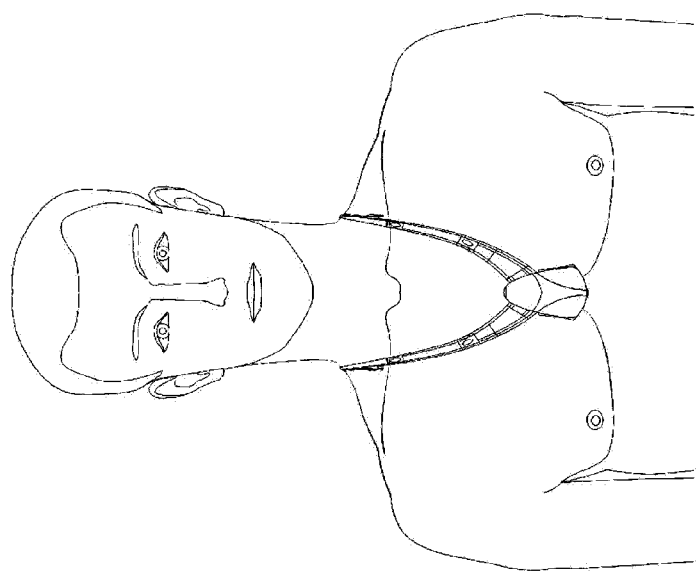
Figure 14:
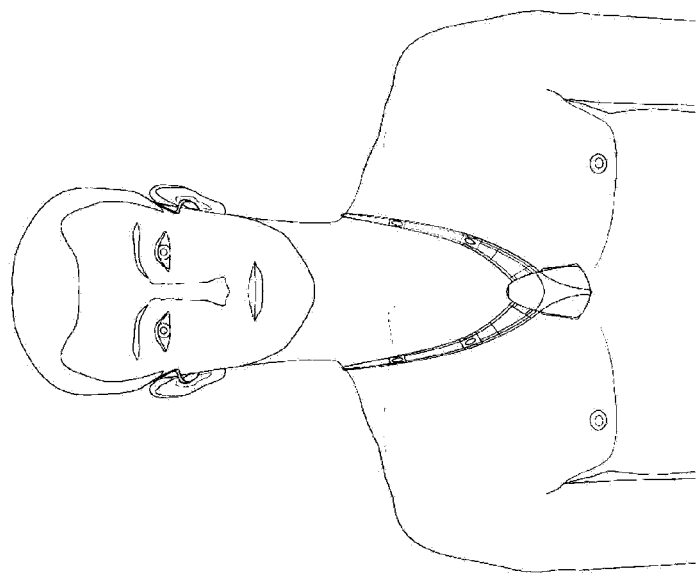

FIGS. 12, 13 14 illustrate options of wearing different embodiments of headsets.

Figure 15:
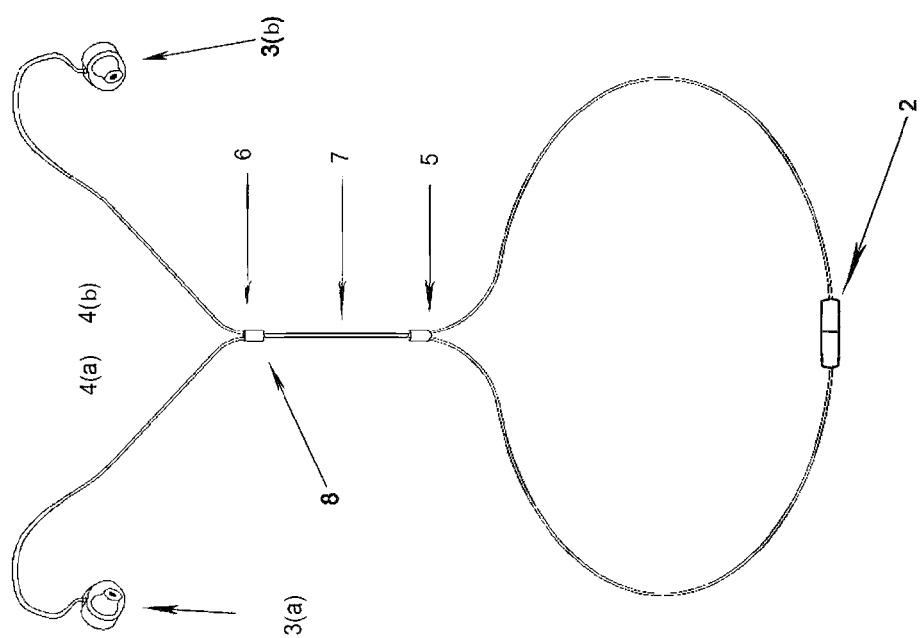
FIG. 15 shows an embodiment of a headset with a suboccipital node in the form of a clip according to the invention.

In various embodiments (FIG. 15) the suboccipital cord connection node 6 may be a clip 8, and the length of the cords can be adjusted by moving the clip along the cords. Also the suboccipital node 6 may comprise an electrical connector to disconnect the cords.

Figure 16:
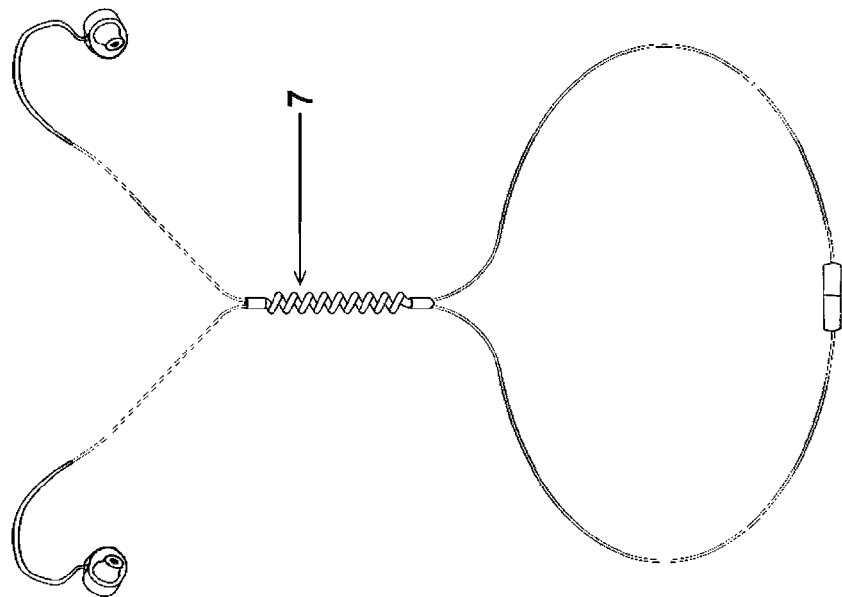
FIGS. 16, 17 show embodiments of a headset with the section of cords between the suboccipital and dorsal cord connections nodes in the form of a helical wire, according to the invention.
Figure 18:
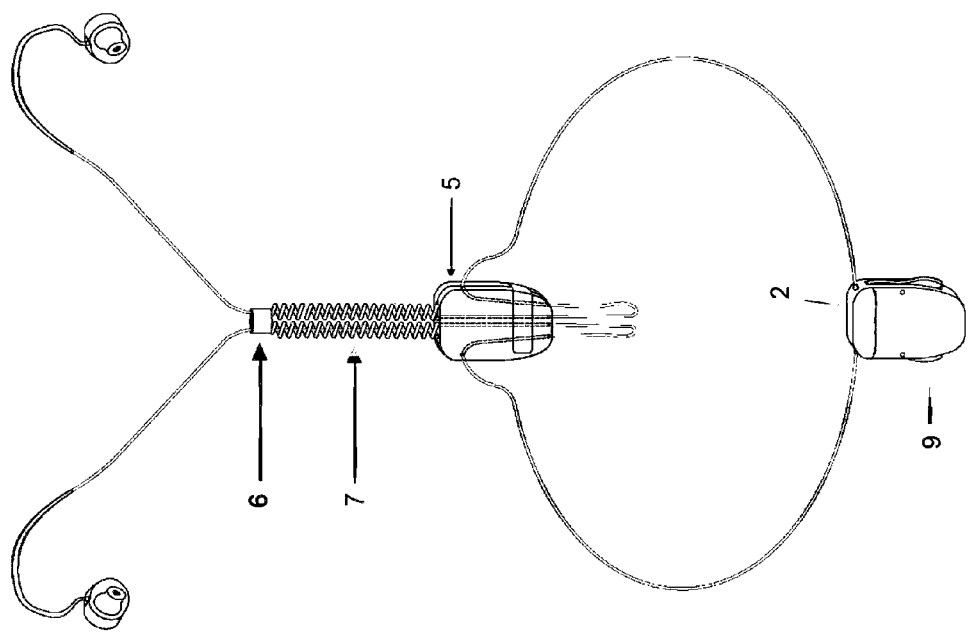
FIGS. 18, 19, 20 show embodiments of a headset with the cord section between the suboccipital and dorsal cord connection nodes in the form of springs, according to the invention.
Figure 17:
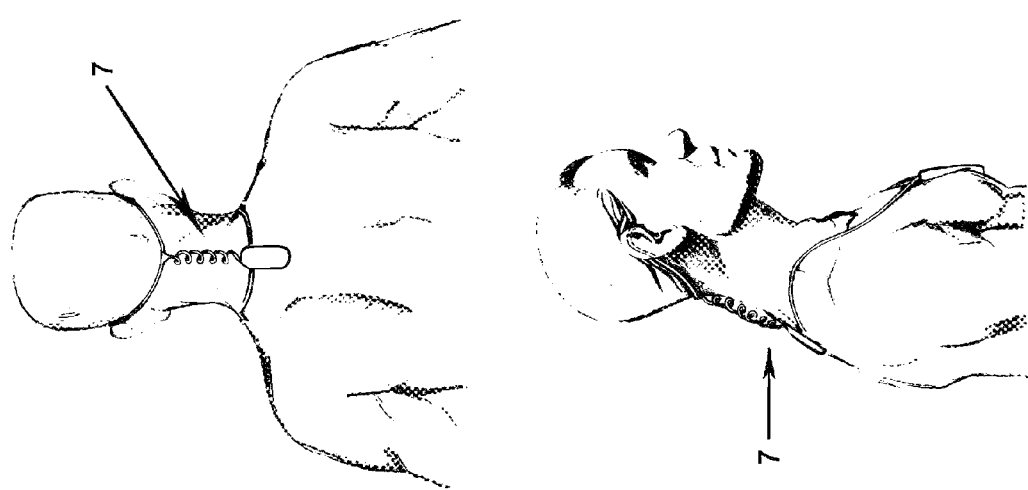
Figure 20:
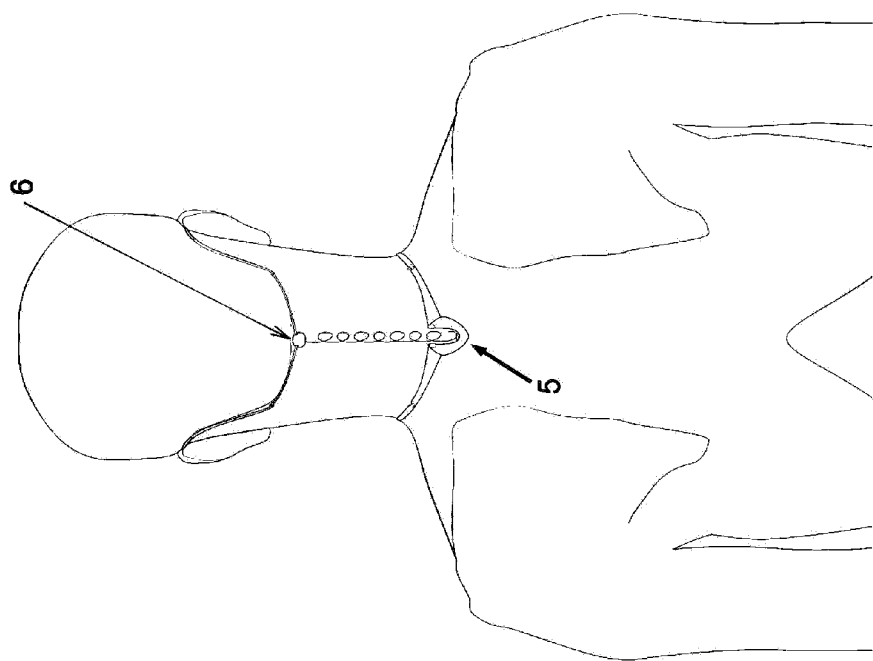
Figure 19:
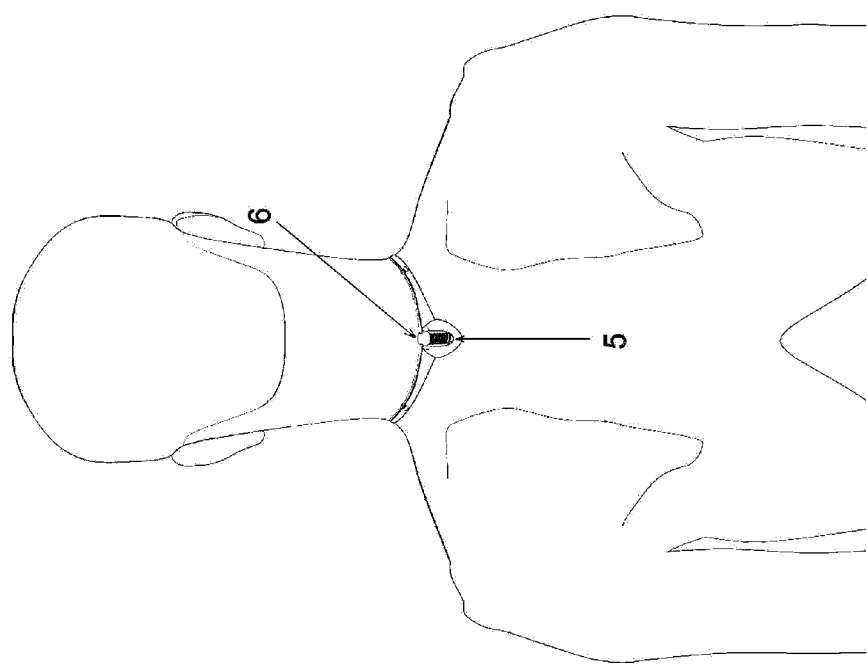
Figure 22:
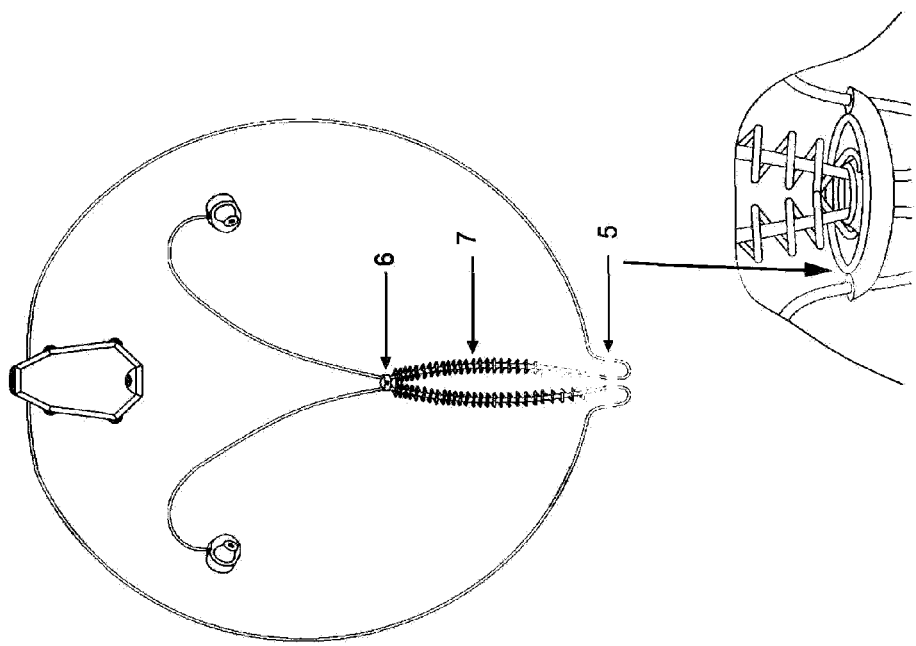
FIG. 22 shows embodiments of a headset with two springs in the section of cords between the suboccipital and dorsal cord connection nodes, according to the invention.
Figure 21:
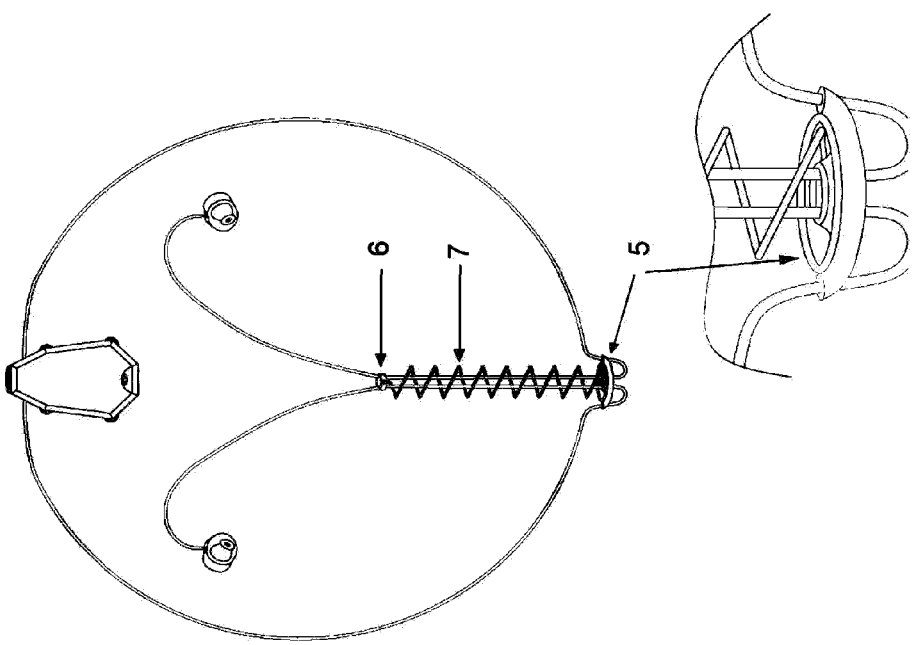
FIG. 21 shows embodiments of a headset with a spring in the section of cords between the suboccipital and dorsal nodes, according to the invention.
Figure 23:
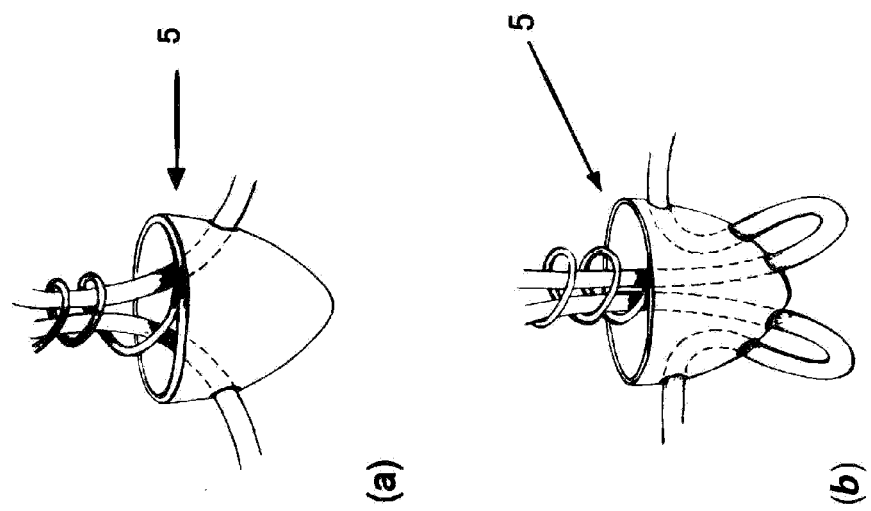
FIG. 23a, b shows embodiments of a dorsal cord connection node.

At least one cord of the section 7 between the suboccipital and dorsal cord connection nodes can be configured as a helical spring. In the embodiments shown in FIGS. 16, 17 the cord section 7 between the suboccipital and dorsal cord connection nodes is in the form of a helical cord and is actually a tension spring. Various embodiments of a headset with a cord section between the suboccipital and dorsal cord connection nodes in the form of springs are shown in FIGS. 18, 19, 20. In some embodiments, the headset includes a spring inserted between the suboccipital 6 and dorsal 5 cord connection nodes (FIGS. 21, 22). FIG. 23a, b shows embodiments of the dorsal cord connection node 5.

Figure 24:
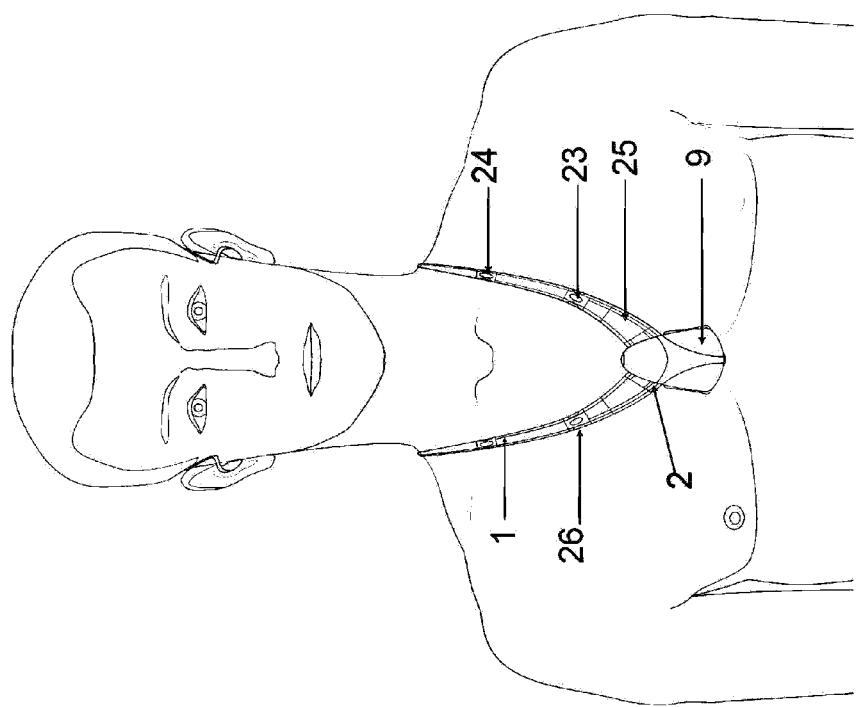
FIG. 24 shows an embodiment of a headset with an electronic unit.

In preferred embodiments (FIGS. 18, 24) a headset comprises at least one electronic control unit 9 mechanically and electrically connected to an electrical connector 2; the electronic unit can be configured as a medallion. The electronic unit may comprise a license-exempt signal transceiver, such as Bluetooth, to receive signal from a cell phone; there may further be a battery, player, radio, USB flash drive, electronic key, satellite signal receiver, such as GPS and/or GLONASS receiver, to tell coordinates through voice commands transmitted directly to the user's earphones. FIG. 25 shows possible electronic components incorporates into the electronic unit. The electronic unit communicates with a mobile phone, satellite navigation system, computer or mobile station via a radio communications module 10. A signal processor 11 processes audio signals, and controls and manages data streams. Digital-to-analog conversion and amplification of signal, and volume control are performed by a codec or an audio module 12. A memory module 13 stores control software, hardware setting profiles and user's information. Power supply, such as a battery 14 incorporated in the electronic unit and/or disposed on the neck loop provides operation of microcircuit chips. The electronic unit may include control buttons, such as 15, 16. A short-range Near Field Connection module 17 can be used for data exchange and quick coupling with a mobile electronic device.

In various embodiments of a headset the electronic unit accommodates the following accessories: an extra controller 18 for processing signals from control buttons; a slot 20 with a connector to connect an external flash memory, a USB connector 21 for data transfer or charging the battery. Connectors 22 are used to connect earphones, external microphones, and additional control buttons.

In various embodiments (FIG. 24) 1 control means in the form of buttons 15, 16 can be disposed on the neck loop, and in some cases, a control command may be issued only by pressing two buttons at the same time. In some embodiments, acoustic announcement may be transmitted to the user's earphone only when a command is issued.

In some embodiments (FIG. 26) control buttons comprise bordering flanges to prevent accidental pressure.

In various embodiments of the headset control buttons and keys (FIG. 24) are disposed both on the housing of the electronic unit and the neck loop.

Ergonomic advantage of this interface manifests itself in the fact that control buttons and keys are disposed on the user's body in the region of an isosceles triangle with a horizontal base, lying between the proximal ends of the clavicles, and a vertex directed downward in the region of xiphoid appendix, and slightly higher for women, so that the reach area of the body field of hand movements takes into account the user's clothes not only in warm, but also in cold climate, for example, a man in the standard European clothes is shown; this allows the user to manage the headset without having to take it out of clothes, by pressing buttons and keys that are easy to find on the touch over the conventional clothes because they are relatively non-displaceable, projected at about the same place relative to the user's body; the keys are tactilely distinguishable from one another and may provide a feedback in the form of tactile or audible (click) response when pressed. In some embodiments, control keys may be fixed, and a switch on the piezoelectric element or a resistive pressure sensor may be used. Click or another audible feedback indicating that a function has been switched may be unheard by others and reflected only in user's earphones.

Switchable keys available on the electronic unit and neck the loop may provide the following standard functions:
1) On/Off
2) Call answering
3) Call Completion
4) Stop/Continue
5) Louder
6) Quieter
7) Switch tracks forth
8) Switch tracks back
9) Forward winding
10) Rewind
11) Voice command: Call
12) Other voice commands.

Buttons are spaced relative to each other, e.g. buttons on the electronic unit are duplicated, and buttons on the neck loop are disposed on separate boards, protected from accidental pressure and connected to the electronic unit via a separate cord.

Furthermore, pressure can be made at once on two opposite buttons with two fingers, thumb and forefinger, simultaneously on both sides of the neck loop relative to the electronic unit. This eliminates accidental pressure with vehicle safety belt, bag strap, etc. Such an arrangement of buttons provides for maximum accessibility to them, even when wearing a tie, suit or coat.

Call answering button may be positioned on one of the earphones.

Figure 27:
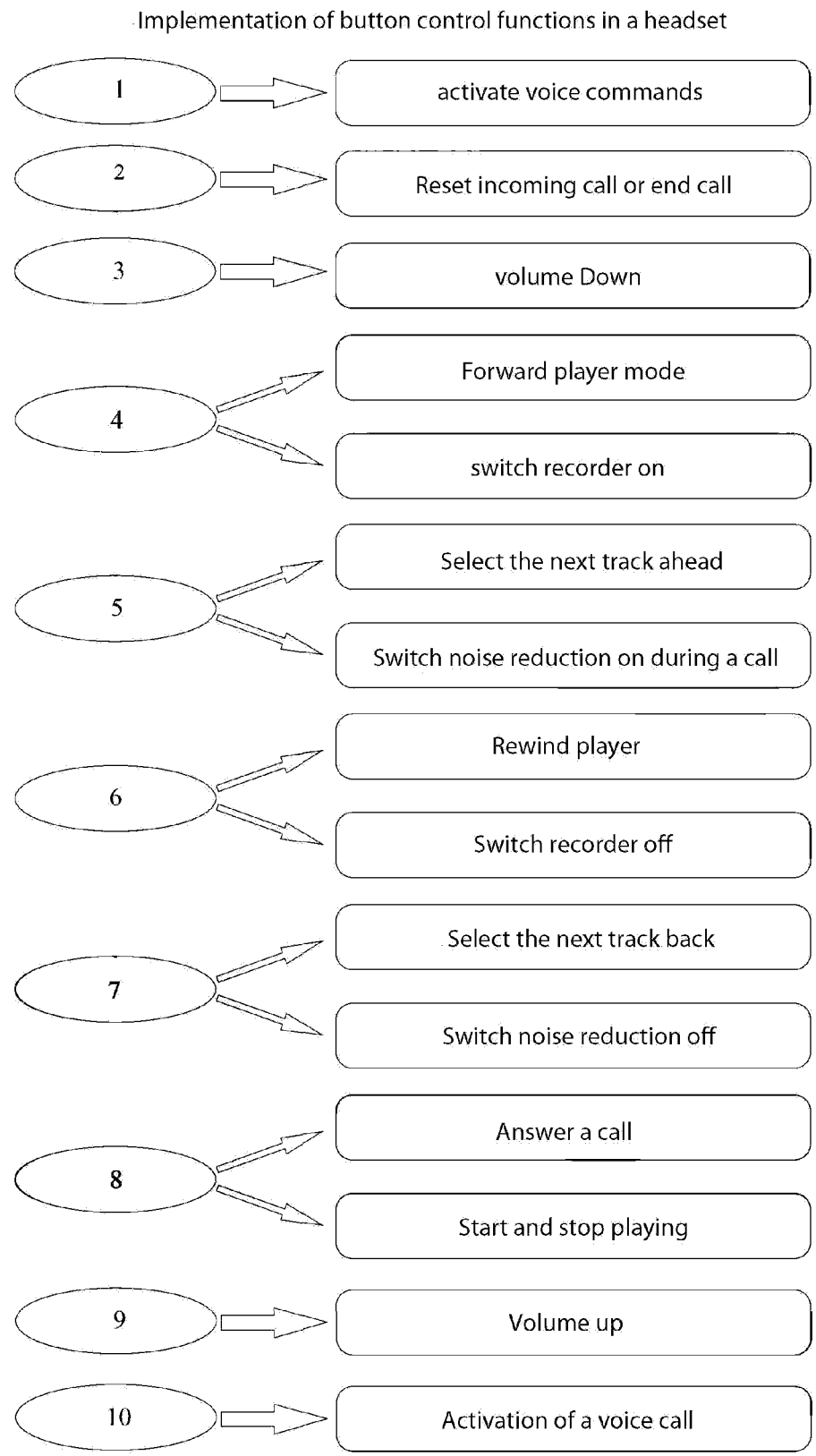
FIG. 27, 28 show implementation of button control functions in an embodiment of a headset according to the invention.
Figure 28:
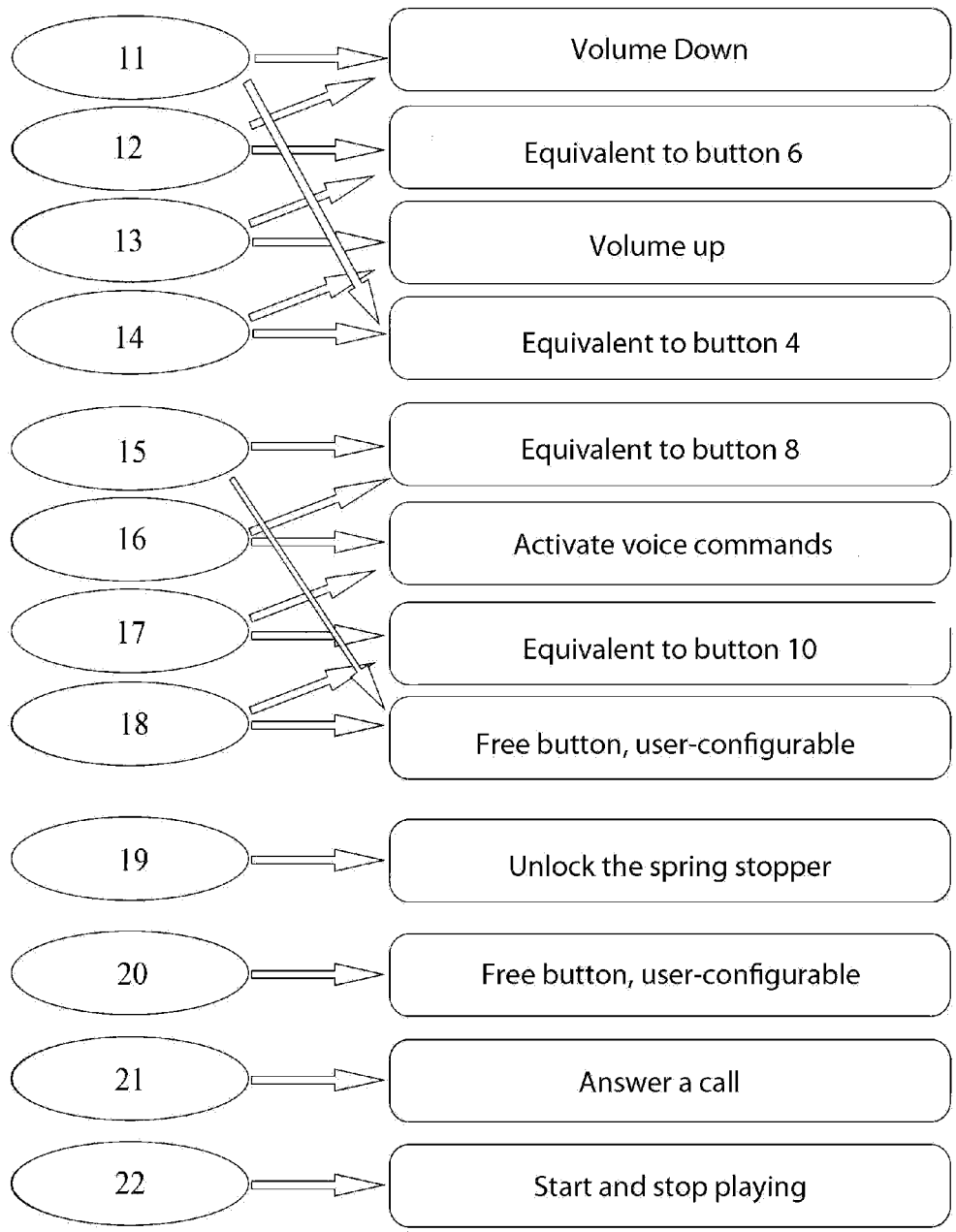

FIGS. 27, 28 show maximum possible allocation of key functions. An electronic voice device may be used to announce about settings that have been made.

FIG. 29 shows examples of algorithms implemented when buttons are pressed. Arrows point to the functions carried out at pressing the buttons. A button divided into two parts means a dual button.

In one embodiment a call answering button may be positioned in one of the earphones. When a call is received the user either puts on the taken-off earphone simultaneously pressing the button, or simply adjusts the earphone to provide its better position in the auricle and simultaneously presses the button to answer the call. To avoid accidental pressure on the button in other cases, the button is operated only at incoming call and does not have any other functions at other times: during a telephone conversation, while listening to music or in standby mode.

In an embodiment of a headset (FIG. 24) power supply 25 and microphone 26 can be disposed on a neck loop 1. Power supplies (batteries) may be distributed in different parts of the headset: in the electronic unit together with the main hardware base, a round flat battery lying on the body, mostly in the upper abdomen, with the diameter of about 30 mm and thickness of 5 mm, attached below to the electronic control unit via a flexible spring cord, but when the headset is worn by the user having the mobility range in a single plane perpendicular to the plane of the battery itself.

The headset design comprising a suboccipital cord connection node and a short, as compared to the other neck headsets, section of the movable portion of cords connecting the headset with the neck loop allows wearing the headset under user's clothes, thereby eliminating the use of external microphone close to the user's mouth. This leads to the need to provide a special arrangement topology of microphones in the headset and a hardware/software system for processing signals from microphones. The headset including a neck loop, electronic unit and cord connection nodes allows positioning thereon a great number of microphones, including throat microphones, a high-speed digital signal processor, thereby providing hardware and software support for functioning a noise-cancelling system, processing signals from a sufficient number of headset microphones, cutting off background noise and, most importantly, speaking without a microphone close to the user's mouth. The used noise-cancelling system can operate not only for processing output signal, but also for cutting off all external sounds in head earphones; this function can be forcedly turned on in noisy areas: underground, concert hall, etc., and turned off to communicate with others without removing the earphones from ears.

In headset embodiments a microphone for sensing user's speech may be positioned in the upper part of the electronic unit; in more sophisticated embodiments the headset comprises a plurality of microphones (from two to nine) having a specific arrangement topology on the headset and forming a microphone array, comprising appropriate hardware and processing base for high-quality sensing and transmitting the user's speech on communications channels in processed or unprocessed form or for transmitting voice commands to change various functions of the headset.

Figure 30:
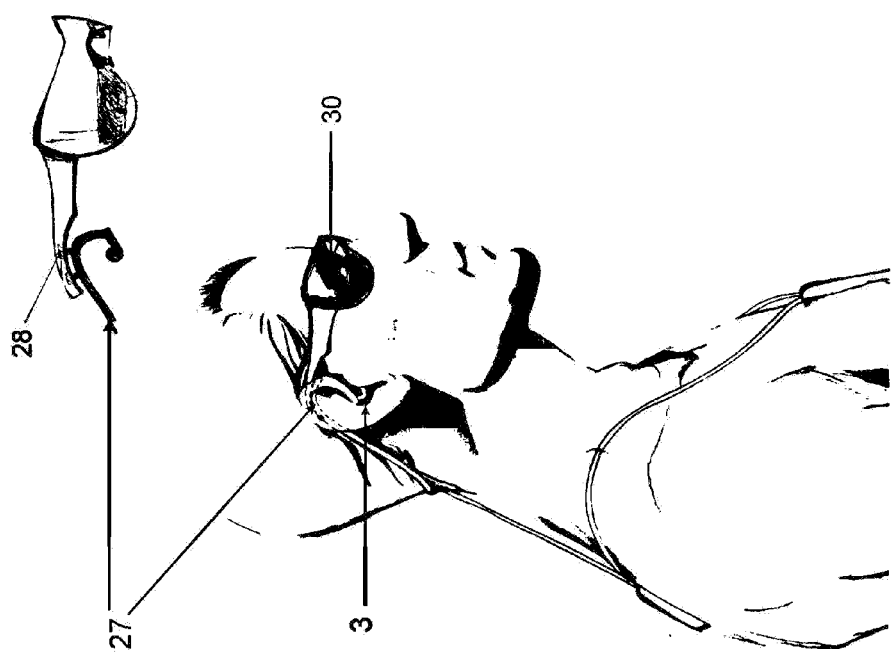
FIG. 30 shows the use of a headset with glasses/screens, according to the invention.
Figure 32:
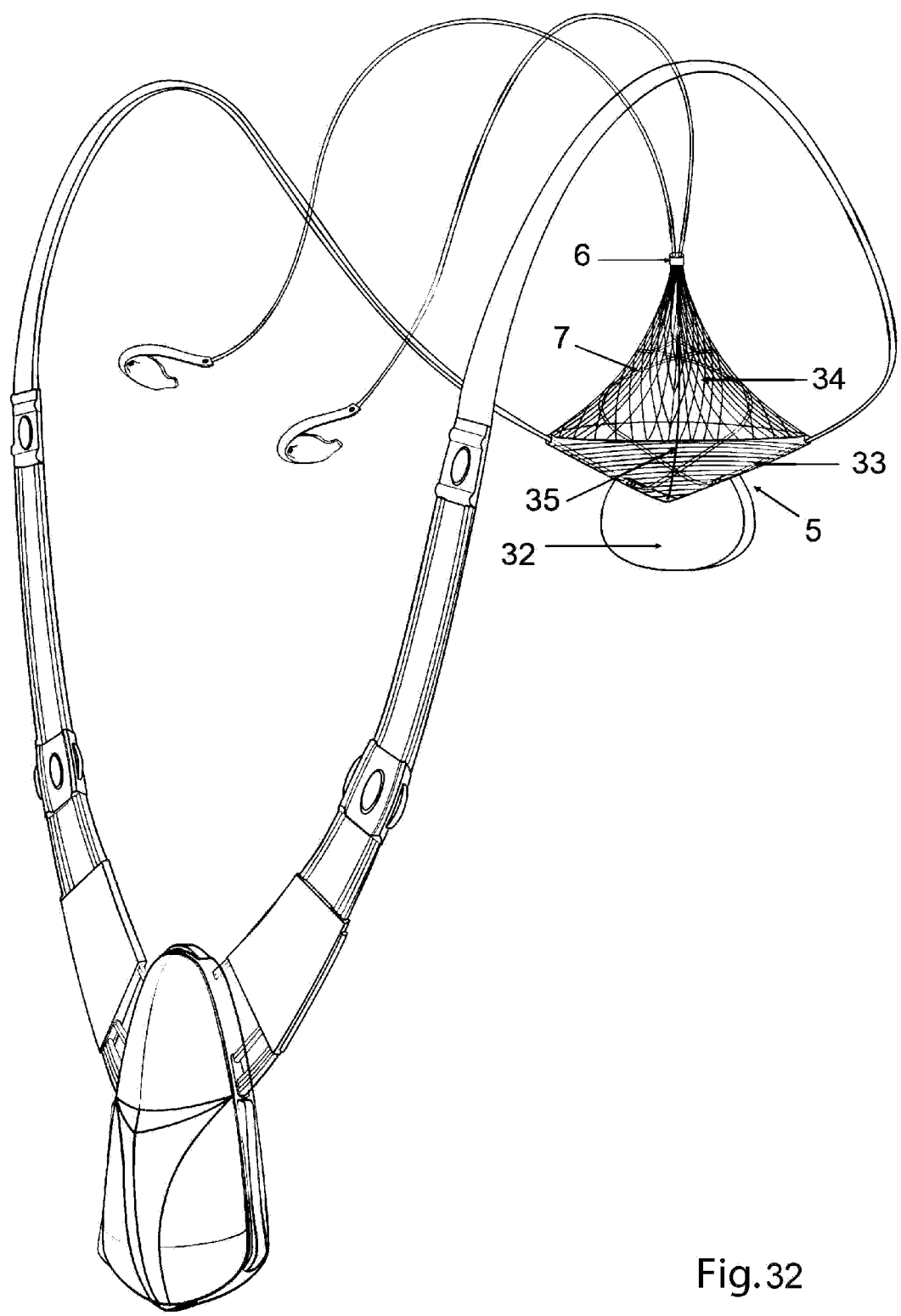
FIG. 32 is an embodiment of a headset comprising a winding mechanism, storage pocket and spring mesh according to the invention.
Figure 35:
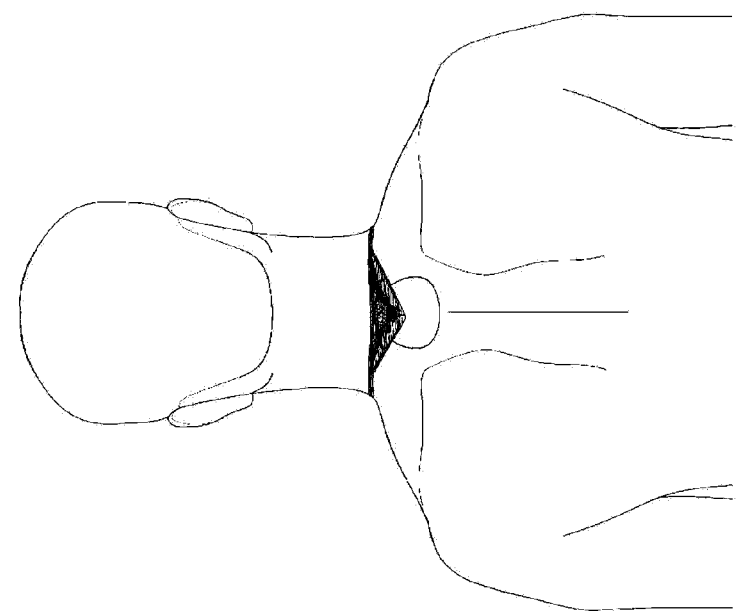
FIG. 35 shows a way of wearing a headset comprising a winding mechanism, storage pocket and spring mesh in non-operational state, according to the invention.
Figure 34:
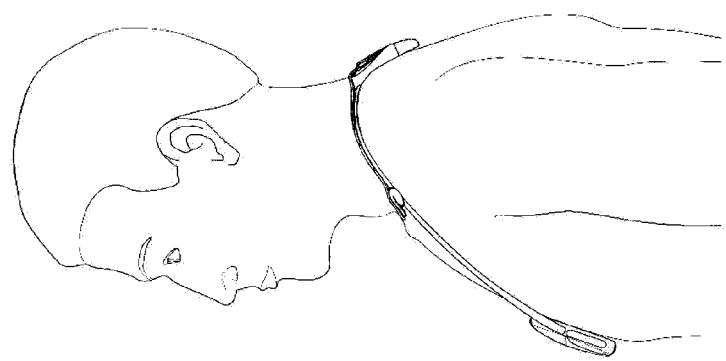
FIG. 34 shows a way of wearing a headset comprising a winding mechanism, storage pocket and spring mesh in non-operational state, according to the invention.
Figure 33:
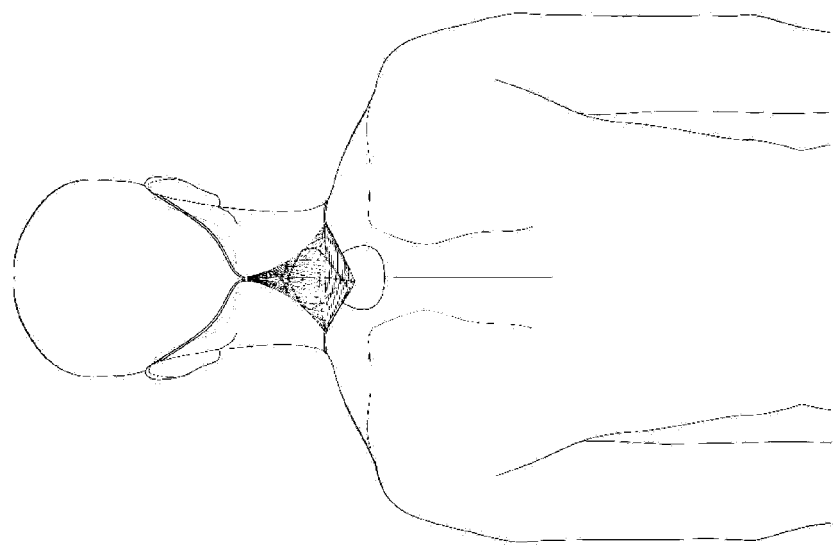
FIG. 33 is shows the way of wearing a headset comprising a winding mechanism, a storage pocket and spring mesh in operational state, according to the invention.

In an embodiment shown in FIG. 30 a portion of the cord near an earphone 3 is accommodated in a tubular guide 27, which has on its surface a contact member 28 for electrically connecting the headset with an additional electronic device 30, e.g. glasses/screens.

In some embodiments the headset can be free of cords transmitting signal to the earphone and have a power cord only; a cordless module can be disposed in each earphone to receive and transmit electromagnetic signal for the earphone.

Figure 31:
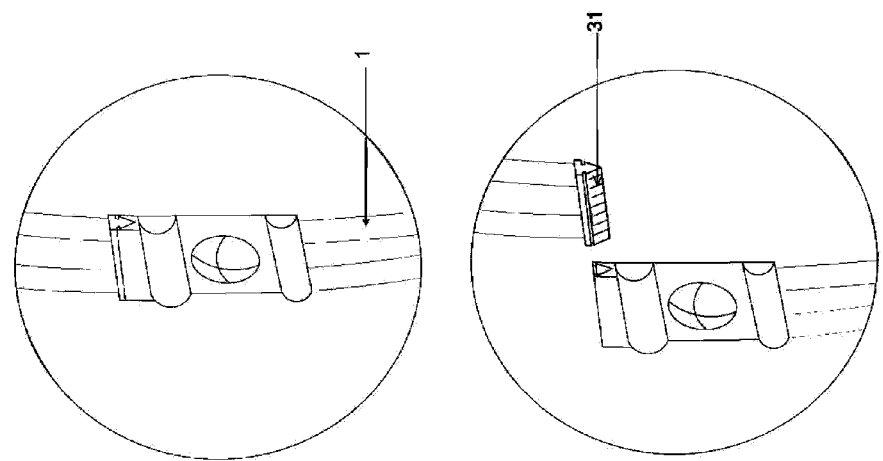
FIG. 31 shows an embodiment of a neck loop connector according to the invention.

A neck loop (FIG. 31) may have at least two slots 31 to connect additional sections of the neck loop.

In preferred embodiments (FIGS. 32, 33, 34, 35) a headset comprises a cord winding mechanism 32 and cord storage pocket 33 disposed on a neck loop. A cone-shaped spring mesh 34 is arranged between nodes 5 and 6, which is attached at the cone vertex to the suboccipital cord connection node 6 and at the cone base on the edge perimeter of the storage pocket 33.

The winding mechanism 32 may comprise a reel with a helical spring inside and a fishing line 35 wound around the reel and connected at one end to the reel and at the other end to the suboccipital cord connection node 6 so that when the fishing line is wound on the reel the suboccipital cord connection node 6 is drawn to the dorsal cord connection node 5 and the section 7 of cords between the suboccipital and dorsal nodes is accommodated in the storage pocket 33.

Figure 36:
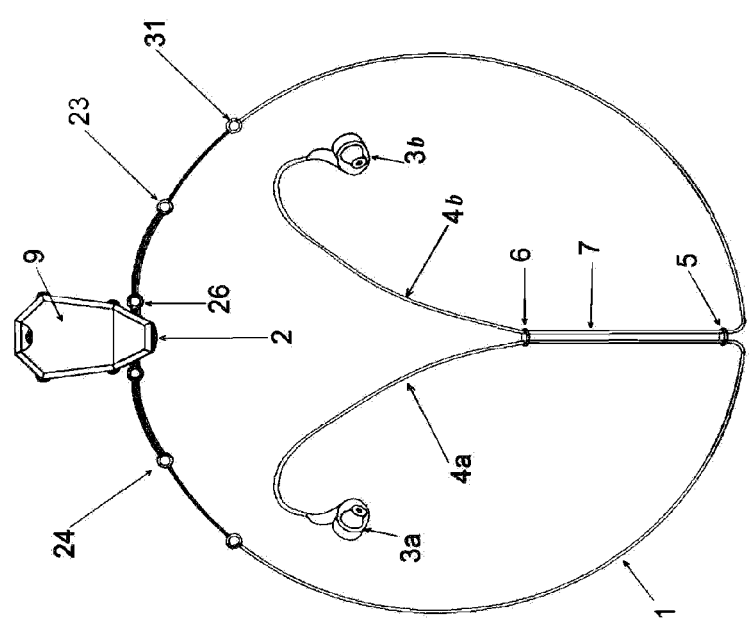
FIG. 36 shows a general view of a headset in one embodiment, showing the main functional components according to the invention.

A headset (FIG. 36) for a mobile electronic device comprises: two earphones 3 a, b; an electrical connector 2; two cords 4, a and b, each connected at one end to one of the earphones 4 a, b, and at the other end to the electrical connector 2; said two cords are mechanically connected to each other to form a neck loop 1 by sections of cords, which are located between the point 5 of connection with each other and the electrical connector 2; the two cords are further mechanically connected to each other in place 6 located on sections of cords between the earphones and the neck loop.

Figure 37:
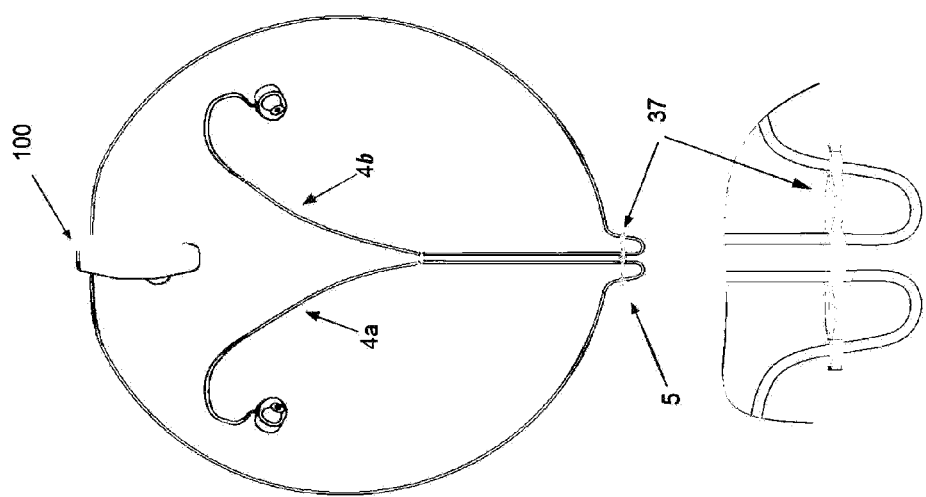
FIG. 37 shows an embodiment of a headset with cords connected by a clip, according to the invention.

Headset cords can be connected to each other by at least one clip enabling to adjust the length of the cords by moving the clip along the cords and/or cords inside the clip. In the embodiment shown in FIG. 37, a headset comprises a central clip and two additional clips 37 disposed on either side of the central clip and adapted to fix the length of the neck loop cords, while the central clip, through which the cords pass in opposite directions, is designed to form two loops to adjust the length of the cords.

Figure 38:
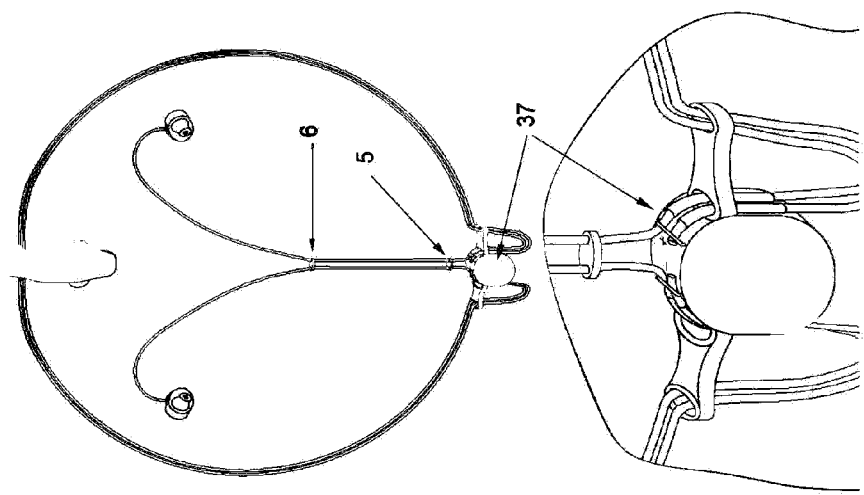
FIG. 38 depicts an embodiment of a headset with a mechanism of pulling cords, in which the cords are connected according to the invention.
Figure 40:
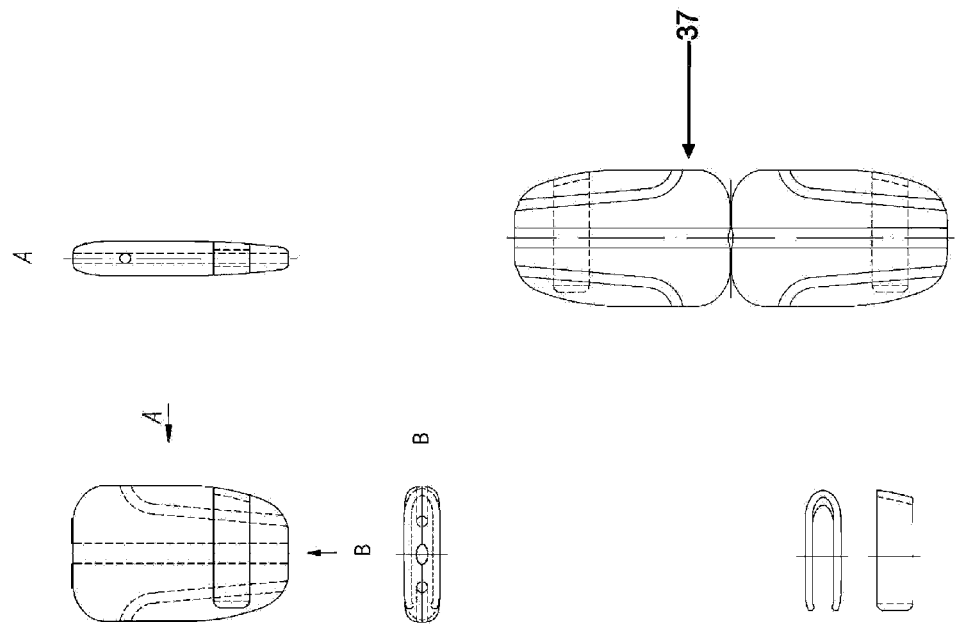
FIGS. 39 and 40 show various designs of clips, according to the invention.
Figure 39:
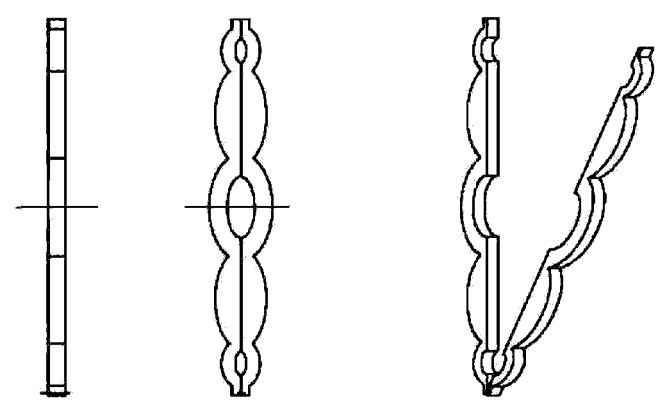

FIG. 38 shows another embodiment of a headset with clips. FIGS. 39, 40 show various designs of clips 37.

In a preferred embodiment (FIG. 36) a headset comprises at least one electronic control unit 9 mechanically and electrically connected to an electrical connector 2. At least two control means 23, 24 in the form of buttons are disposed on the cords forming a neck loop. The control buttons may have bordering flanges for protection against accidental pressure (FIG. 26). In a preferred embodiment at least one power supply and/or at least one microphone 26 may be disposed on the cords forming the neck loop, and cords 4a, b may comprise at least one additional electrical connector 36 and/or contact member.

Figure 41:
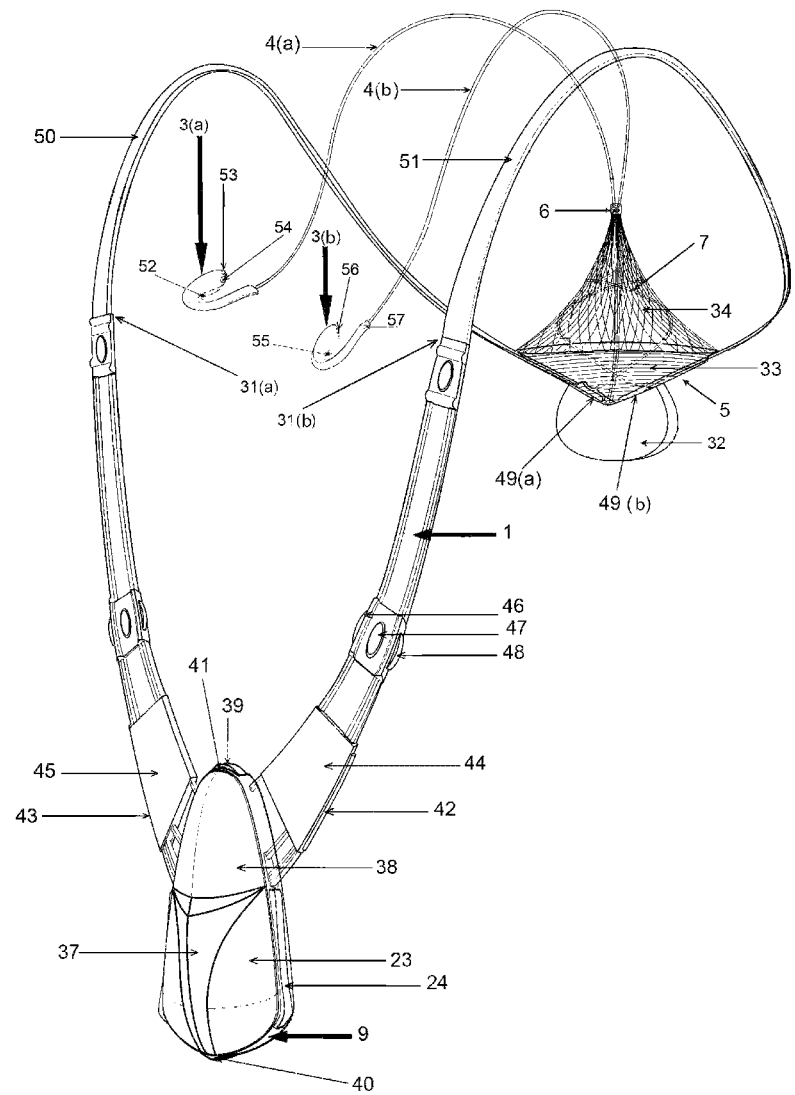
FIG. 41 is a schematic diagram of a headset as a multifunctional portable device, according to the invention.

FIG. 41 shows a schematic diagram of a headset as a multi-function portable device.

An electronic unit 9 provides electrical communications in user's Personal Area Network (PAN) with a mobile phone, player, radio station through a wireless transceiver of electromagnetic signal with license-exempt parameters, for example, Bluetooth, Kleer, ZigBee, AirPlay, Ultra-Wide Band, Piconet and others; in various embodiments the electronic unit may be a phone or smartphone, radio station, player, radio, Wi-Fi or GPS receiver, electronic key or data medium.

The electronic unit is connected to the neck loop 1 via an electrical connector, which is accommodated in the electronic unit in this embodiment. When the headset is worn, the electronic unit is preferably positioned on the user's chest.

As one of the objects in creating a headset is to enable wearing the headset under clothes and managing it over the clothes on the touch, while avoiding accidental pressure, some structural features have been provided. Electronic unit 9 has a protective rib 37 to separate buttons 23, 24, 38 that have different functions. When buttons 39 and 40 are pressed simultaneously, a reel or rolls that are included in a winding mechanism disposed in the region of a dorsal cord connection node 5 in this embodiment are unlocked. A microphone 41 is also disposed on the electronic unit. Microphones 42, 43, batteries 44, 45 and interface buttons such as buttons 46, 47, 48 are disposed on the neck loop. Connectors 31a, b and 49a, b allow replacement of detachable parts of the neck loop 50, 51 for individual adjustment of the headset.

Further arranged on the neck loop are connecting/adjusting, pulling/winding mechanisms 32, a cord storage pocket 33, and a mesh spring 34; when the headset is worn they are positioned on the outer surface of the upper part of the user's back, on the border with the lower dorsal surface of the neck.

When the headset is worn, section 7 of cords between the suboccipital and dorsal cords connection nodes and the suboccipital cord connection node 6 is positioned on the dorsal surface of the user's neck up to the suboccipital part, where cord sections 4a, b are V-like split and settle on the user's skin in a relatively taut state, and they are directed over the auricle to earphones 3a, b placed in the user's auricles.

Microphones 52, 53, 55, 57 and audio channels 54, 56 are disposed on earphones 3a, b.

Figure 42:
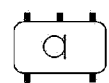
FIG. 42 shows a possible set of contact members of digital microphones, according to the invention.
Figure 43:
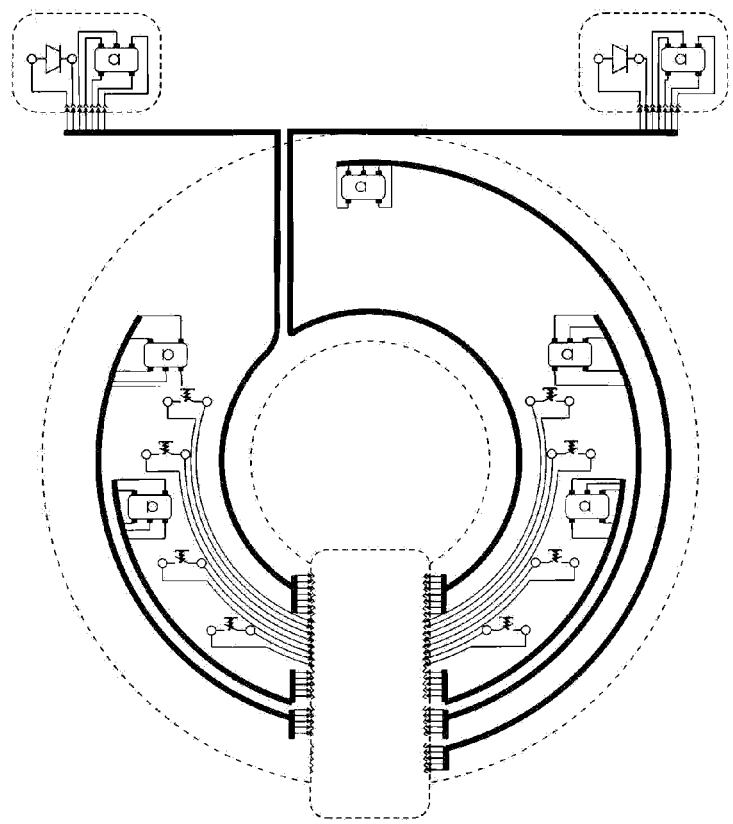
FIGS. 43, 44 show circuitry of an embodiment of a headset according to the invention.
Figure 44:
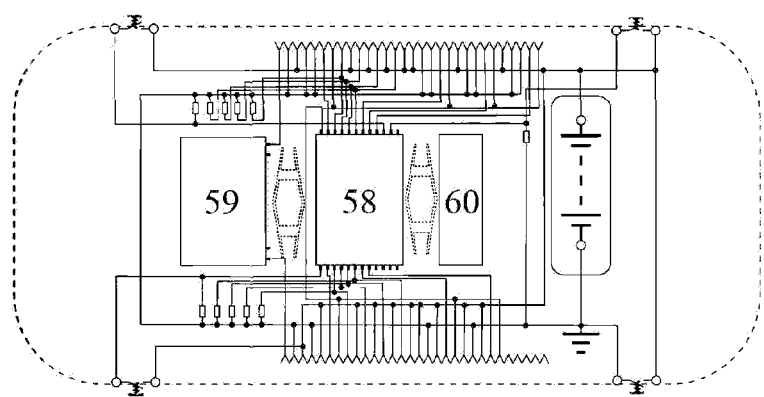

FIGS. 42, 43, 44 show a connection circuitry of keys and microphones in one embodiment of the headset. This embodiment includes twelve keys and seven microphones. The microphones are digital microphones with a standard set of contact members shown in FIG. 42.

Data outputs to contact members, synch signal inputs of the microphones and control keys are connected to inputs of a signal processor or controller 58 (FIG. 43). Earphones are connected to a control chip, CODEC 59, or an audio module, which comprise a digital-to-analog converter, a controllable-gain amplifier. In operation the processor data exchanges data with peripheral devices 60 as well. FIG. 44 shows electrical circuitry of the headset.

Antennas of a Bluetooth or another wireless module can be positioned on the neck loop, preferably according to the Vvedensky formula, at the level of user's shoulders to provide better conditions for reception and transmission.

In some embodiments the headset has a vibration mechanism for incoming call.

The headset can also accommodate position sensors, accelerometers to assist in navigation with voice prompts of GPS device. If accelerometers are positioned on earphone arms or in earphones as such, the navigation system housed in the headset will be able to determine the direction of rotation of the user's head.

Benefits from achieving the main technical effect, such as: shortening by more than two times the length of the movable part of cords, i.e. the section between the nodes, convenient position and tension of cords on surface of the body, and immobility of the remaining cord portions, allows the headset to be worn under clothes in operational and non-operational state, and throat microphones to be disposed thereon.

In many embodiments the headset can be controlled without taking it from under the clothes or a phone from the pocket, because the buttons located under clothes can be pressed from outside, over clothes, or by giving voice commands without hand manipulations at all. However, it should be borne in mind that to activate voice commands a button on the headset is still to be pressed, which increases the value of the tactile interface used in the headset.

With a constantly worn, but nearly invisible headset the user can be in touch, listen to music, podcasts, and receive current voice information without impairing the user's appearance and differentiating oneself from others.

The headset allows combining an electronic device with bijouterie.

Use of the headset reduces the phone radiation on the brain.

Direct contact between the device and the user's skin allows positioning on the headset sensors for monitoring the state of user's health, such as temperature, blood pressure, sugar, alcohol in skin secretions, etc., to monitor galvanic skin response for control of the sympathetic nervous system, which allows using the headset as a part of a biotelemetry complex for medical diagnostics.

The headset can be used not only as an option to a mobile phone, but also as a component of a wearable mobile complex with hardware dispersed in several devices carried by a person, for example, some of hardware and battery base can be accommodated in a man's trouser belt, while the wired connection to the headset can be implemented in a cord, which lies under the clothes along the user's spine on the back; the headset itself can be a mobile phone or smartphone, while a separately worn screen/keyboard unit can be a wireless interface to it.

With further development of technologies that enhance capabilities of voice communications between human and computer, as well as with wide spread of 3G and 4G communication the advantages of the headset become even more obvious, in particular: improved quality of communications with the ability to speak and listen to a counterpart on phone using HD-voice telephony and stereo mode; GPS navigation without visual inspection of the map, but only with voice commands sent to user's earphones; development of new voice Internet and web surfing services without a screen and mouse, but only through a voice interface. When a user performs any actions, functions or operations which involve both hands, if the headset is available, it is possible to be constantly in touch or in network without focusing on keeping the phone, but using voice prompts of the operator or computer.

Figure 45:
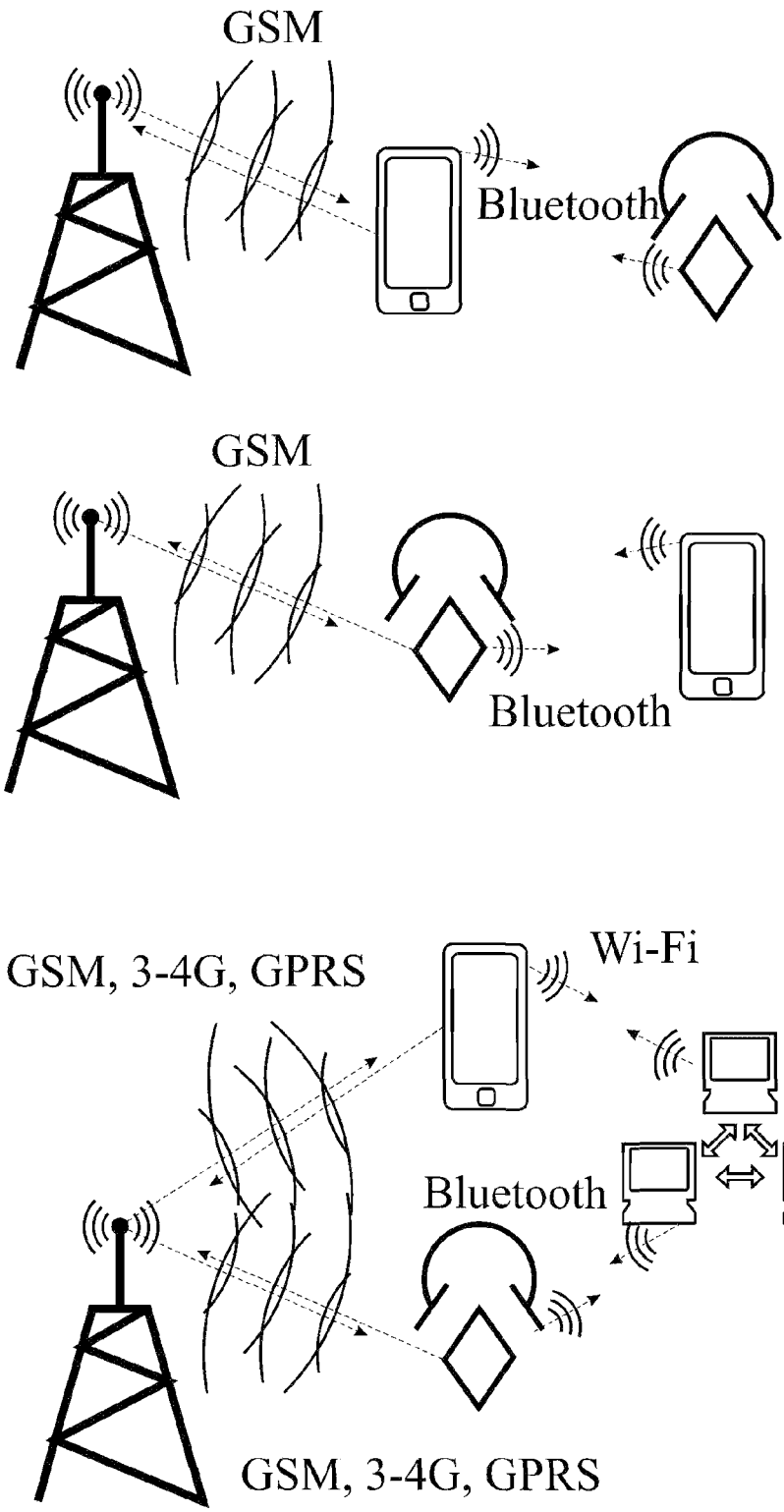
FIG. 45 shows the use of a headset according to the invention.

The headset can be a part of an integral complex (FIG. 45), which includes, along with glasses/screens and other body-worn mobile devices, home or office computers implementing permanent communications between themselves and the operator base; such a complex can be called "cloud mobiling" by analogy with "cloud computing".

The invention claimed is:

1. A headset for a mobile electronic device, comprising: a neck loop with at least one electrical connector attached thereto; two earphones; two cords, each of the cords being connected at one end to one of the earphones and at the other end to the electrical connector; wherein said two cords are mechanically connected to the neck loop, and points of connection of the cords to the neck loop are in close proximity to each other and form a dorsal cord connection node, and are further mechanically connected to each other in sections between the earphones and the dorsal cord connection node to form a suboccipital cord connection node at the connection point.

2. A headset according to claim 1, wherein the dorsal cord connection node and the suboccipital cord connection node are disposed, when worn by the user in operational state, on the dorsal surface of the neck, and cords in sections between the earphones and the suboccipital node are to be placed over the auricle.

3. A headset according to claim 1, wherein cords in sections between the earphones and the suboccipital cord connection node, when worn by the user in operational condition, are disposed on the surface of the head in taut state.

4. A headset according to claim 1, wherein when worn by the user in operational state the dorsal cord connection node is positioned at the level of the seventh cervical vertebra, the suboccipital cord connection node is positioned at the level of the external occipital protuberance, and the section of cords between the suboccipital and dorsal cord connection nodes has a length determined by the maximum distance between the first and seventh cervical vertebrae of the user, measured on the dorsal surface of the neck with the head rotated sideway and tilted downward at the same time.

5. A headset according to claim 1, wherein the section of cords between the suboccipital and dorsal cord connection nodes has a length in the range from 5 cm to 13 cm.

6. A headset according to claim 1, wherein the suboccipital cord connection node is a clip adapted to move along the cords for adjusting the length of the cords.

7. A headset according to claim 1, wherein the suboccipital node comprises an electrical connector for disconnecting the cords.

8. A headset according to claim 1, wherein at least one cord in the section between the suboccipital and dorsal cord connection nodes is in the form of a helical spring.

9. A headset according to claim 1, further comprising a spring disposed between the suboccipital and dorsal cord connection nodes.

10. A headset according to claim 1, further comprising at least one electronic unit mechanically and electrically coupled to at least one electrical connector.

11. A headset according to claim 1, further comprising at least two control means in the form of buttons disposed on the neck loop.

12. A headset according to claim 11, wherein said control means are adapted to transmit acoustic warning to the user's earphone only when a command is issued.

13. A headset according to claim 11, wherein said buttons of the control means have bordering flanges to prevent accidental pressing.

14. A headset according to claim 1, further comprising at least one power supply disposed on the neck loop.

15. A headset according to claim 1, further comprising at least one microphone disposed on the neck loop.

16. A headset according to claim 1, wherein a part of the cord near the earphone is accommodated in a tubular guide, and the tubular guide has a contact member on its outer surface to electrically connect the headset with an additional electronic device.

17. A headset according to claim 1, wherein the neck loop comprises at least two connectors to connect additional sections of the neck loop.

18. A headset according to claim 1, further comprising a cord winding mechanism and a cord storage pocket, both disposed on the neck loop.

19. A headset according to claim 18, further comprising a cone-shaped spring mesh attached at the apex to the suboccipital cord connection node and at the base to the edge perimeter of the storage pocket.

20. A headset according to claim 18, wherein the cord winding mechanism comprises a reel with a helical spring accommodated inside and a fishing line wound on the reel and connected at one end to the reel and at the other end to the suboccipital cord connection node, so that when the fishing line is wound on the reel the suboccipital cord connection node is drawn to the dorsal cord connection node, and the section of cords between the suboccipital and dorsal cord connection nodes is arranged in the storage pocket.

21. A headset for a mobile electronic device, comprising two earphones, an electrical connector, two cords, each of the cords being connected at one end to one of the earphones and at the other end to the electrical connector; said two cords are mechanically connected to each other to form a dorsal cord connection node at the connection point; wherein sections of cords arranged between the dorsal cord connection node and the electrical connector forming a neck loop; wherein said two cords are further mechanically connected to each other at a point on the sections of cords between the earphones and the neck loop to form a suboccipital cord connection node at the connection point; wherein the dorsal cord connection node is intended to be positioned at the dorsal surface of the neck and the suboccipital cord connection node is intended to be positioned at the level of the external occipital protuberance of user's neck, and the section of cords between the suboccipital and dorsal cord connection nodes has a length in the range from 5 cm to 13 cm.

22. A headset according to claim 21, wherein the cords are connected to each other by at least one clip adapted to move along the cords for adjusting the length of the cords against each other.

23. A headset according to claim 21, further comprising at least one electronic unit connected mechanically and electrically to the electrical connector.

24. A headset according to claim 21, further comprising at least two control means in the form of buttons disposed on the cords forming the neck loop.

25. A headset according to claim 24, wherein the buttons of a control means comprise bordering flanges to prevent accidental pressing.

26. A headset according to claim 21, further comprising at least one power supply disposed on the cords forming the neck loop.

27. A headset according to claim 21, further comprising at least one microphone disposed on the cords forming the neck loop.

28. A headset according to claim 21, wherein said cords comprise at least one additional electrical connector.

29. A headset according to claim 21, wherein said cords comprise at least one contact member to connect sections of the cords to each other.

* * * * *